(12) United States Patent
Cowan et al.

(10) Patent No.: US 9,430,483 B1
(45) Date of Patent: Aug. 30, 2016

(54) AUTOMATIC FILE SYSTEM MIGRATION TO A NETWORK ATTACHED STORAGE SYSTEM

(71) Applicant: EMC Corporation, Hopkinton, MA (US)

(72) Inventors: Gregory Denis Cowan, Chicago, IL (US); Fergal Gunn, Cork (IE); Karen Murphy, Cork (IE); Jody Hay, Buford, GA (US); Michal Abraham, Presov (SK); Peter Austin Macaulay, Bellingham, MA (US)

(73) Assignee: EMC Corporation, Hopkinton, MA (US)

( * ) Notice: Subject to any disclaimer, the term of this patent is extended or adjusted under 35 U.S.C. 154(b) by 299 days.

(21) Appl. No.: 14/143,396

(22) Filed: Dec. 30, 2013

(51) Int. Cl.
*G06F 17/30* (2006.01)

(52) U.S. Cl.
CPC .............. *G06F 17/30079* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,047,323 A * | 4/2000 | Krause | ............... | G06F 9/4426 709/201 |
| 8,813,209 B2 * | 8/2014 | Bhattacharya | ...... | H04L 41/0813 709/202 |
| 8,850,423 B2 * | 9/2014 | Barkie | ............... | G06F 8/63 717/176 |
| 2008/0270515 A1 * | 10/2008 | Chen | ............... | G06F 9/4856 709/202 |
| 2009/0249284 A1 * | 10/2009 | Antosz | ............... | G06F 8/10 717/104 |
| 2012/0047492 A1 * | 2/2012 | Huang | ............... | G06F 8/60 717/128 |
| 2013/0054521 A1 * | 2/2013 | Cai | ............... | H04L 41/084 707/613 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Shyue Jiunn Hwa
(74) *Attorney, Agent, or Firm* — Ryan, Mason & Lewis, LLP

(57) ABSTRACT

Techniques for automatic file system migration to a network attached storage (NAS) device or system. For example, a method comprises the following steps. A first network attached storage system and a second network attached storage system are designated. A file system on the first network attached storage system is selected to migrate to the second network attached storage system, at least one criterion of the file system on the second network attached storage system is defined, and a configuration of the second network attached storage system is automatically determined based on the defined criterion.

19 Claims, 28 Drawing Sheets

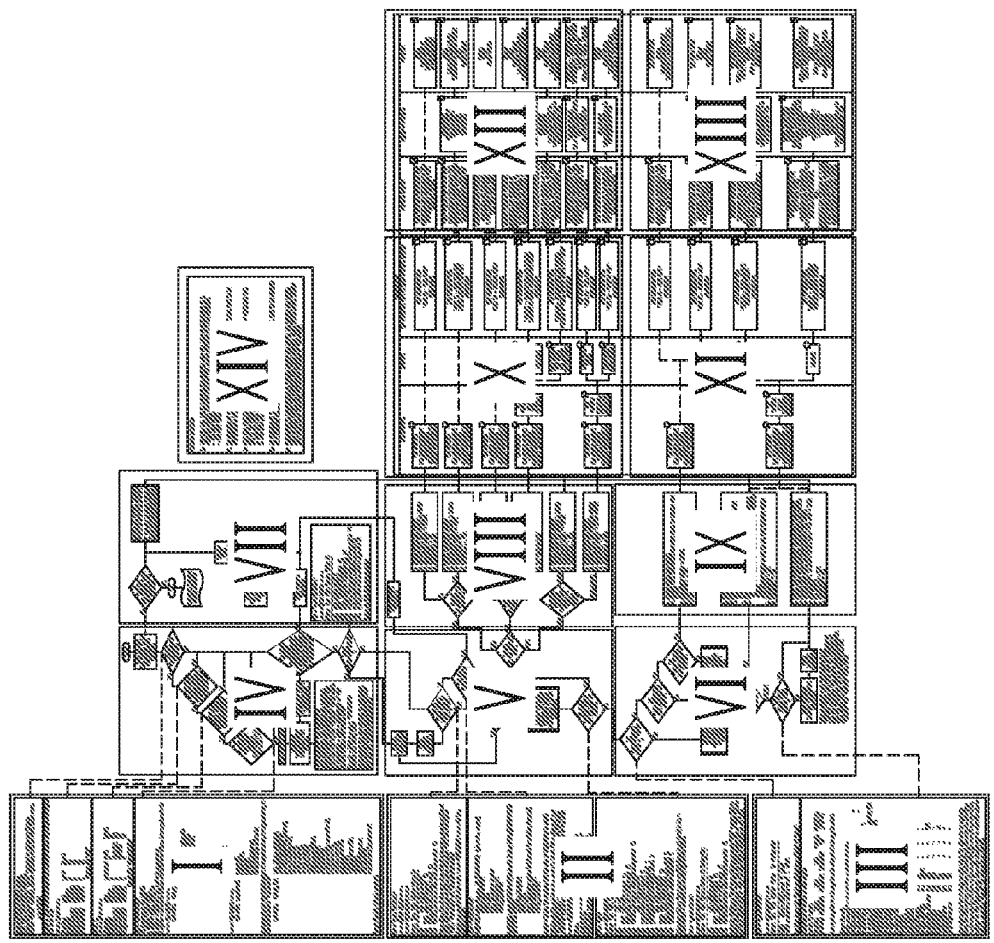

FIG. 4

```
===== SOFTWARE LICENSES =====
NOTE: these license codes are hidden!
they cannot be used in the "license" command to restore your licenses.
use the "license" command, with no arguments, to list the actual license codes.
        a_sis XXXXXXX
```

```
FORMAT A. (this format basically means no longer licensed skip dedupe checking for
the whole filer)
===== DF-S =====
Filesystem          used        saved    %saved
/vol/vol0/          2375828     0        0%
/vol/pascivol01/    400308208   0        0%
/vol/pascivol02/    274368496   0        0%
/vol/pascivol03/    42826464    0        0%
                    Sample file "TBA"
```

```
FORMAT B.
===== DF-S =====
Filesystem          used        compressed   a-sis       %saved
/vol/vol0/          2375828     0            0           0%
/vol/pascivol01/    400308208   0            170368212   30%
/vol/pascivol02/    274368496   0            14192156    5%
/vol/pascivol03/    42826464    0            0           0%
                    Sample file "chnnas001.zip"
```

```
DTO = "volumeStatus"
FYI 4 columns in VOL_STATUS
1. Volume = Volume Name
2. State = online, offline, etc
3. Status = traditional, flex, read only, snapmirrored
4. Options = all options that can be applied to a volume, like snapmirrored= etc ===== VOL-STATUS =====
        vol3 online    raid_dp    nosnap=off,
                                  nosnapdir=off,
                                  minra=off, no_atime_update=off,
                                  raidtype=raid_dp, raidsize=12,
                                  nvfail=off, snapmirrored=off,
                                  resyncsnaptime=60,
                                  create_ucode=off,
                                  convert_ucode=off,
                                  maxdirsize=62914,
                                  fs_size_fixed=off,
                                  create_reserved=off,
                                  fractional_reserve=100
```

```
===== VOL-STATUS =====
        vol3 online   snapmirrored    nosnap=off,
                                      nosnapdir=off,
                                      minra=off,
                                      no_atime_update=off,
                                      raidtype=raid_dp, raidsize=12,
```
*No Sample file with Vol-STATUS Options of snapmirrored=on, or snapvaulted=on, or VOL-STATUS state of "snapmirrored"*
```
        vol0 online   raid_dp, flex   root, diskroot, nosanp=off,
                                      nosnapdir=off, minra=off,
                                      no_atime_update=off, nvfail=off,
                                      ignore_inconsistent=off,
                                      snapmirrored=off,
                                      create_ucode=on,
                                      convert_ucode=off,
                                      maxdirsize=41861,
                                      schedsnapname=ordinal,
                                      fs_size_fixed=off,
                                      compression=off,
                                      guarantee=volume, svo_enable=off,
                                      svo_checksum=off,
                                      svo_allow_rman=off,
                                      svo_reject_errors=off,
                                      no_i2p=off,
                                      fractional_reverse=100,
                                      extent=off,
                                      try_first=volume_grow,
                                      read_realloc=off,
                                      sanpshot_clone_dependency=off
```
*Sample file disk, diskroot sample.txt*

```
DTO = "quota TreeStatus"
===== QTREE-STATUS =====
===== QTREE-STATUS =====
Volume  Tree  Style  Oplocks  Status  ID
-----------------------------------------
vol3          unix   enabled  normal   0
vol3   ETPR   ntfs   enabled  normal   26
vol3   Sharepoint$ ntfs enabled normal 27
vol3   fmcdata_fmccommon ntfs enabled snapvaulted 12
```

This condition is met when any volume without a tree name, then has additional entries with tree names as shown above. file system "vol3" has three qtrees "ETPR", "Sharepoint$" and "fmcdata_fmccommon"

Almost every sample with data under ===== QTREE-STATUS ===== will have examples of this

---

DTO = "fileSystemPath"

/vol/COMM_test_lun/lun_one   20g (21474836480)  (r/w, online, mapped)
        Serial#: Hn/sCZTXDGQI
        Share: none
        Space Reservation: disabled
        Multiprotocol Type: aix
        Maps: g_gridnp=84

/vol/DLAWS_refresh_04JUN2010_old/lun_lawdb1_lawdbvg  117.3g (125913006080) (r/w, online, mapped)
        Serial#: Hn/sCZXjQMYE
        Share: none
        Space Reservation: enabled (not honored by containing Aggregate)
        Multiprotocol Type: aix
        Maps: g_lawdbd1=0

Sample = T1_Lun_info (contains LUN info only. no QTREE Status to match)

Bold above is the root file system created in default /vol, so "lun_one" and "lun_lawdb1_lawdbvg" are both LUNs created in the root of the file system, confirm file system is root under QTREE Status where there is no tree name.

```
===== QTREE-STATUS =====
Volume                          Tree   Style  Oplocks  Status  ID
------------------------------- ----   -----  -------  ------  --
COMM_test_lun                          unix   enabled  normal  0
DLAWS_refresh_04JUN2010_old            ntfs   enabled  normal  26
```

⋮

⋮

```
DTO = "type"
===== QTREE-STATUS =====
Volume  Tree  Style  Oplocks  Status  ID
---------------------------------------
vol3           unix enabled normal  0
vol3    ETPR   ntfs enabled normal  26
vol3    Sharepoint$ ntfs enabled normal  27
vol3    fmcdata_fmccommon ntfs enabled snapvaulted  12
vol4           unix enabled normal  0
vol4    current mixed enabled normal  3
vol4    portalappsdev mixed enabled normal  1
vol4    portalappsremote mixed enabled normal  2
vol2           unix enabled normal  0
vol2    ETPR2  mixed enabled normal  17
vol2    pvola_previous mixed enabled snapvaulted  8
vol2    sofcdata_randd ntfs enabled snapvaulted  9
```

Each volume with no "tree" name specified (shown in red above) in the = QTREE-STATUS = section is the security style for the Volume.

```
DTO = "quotaTreeStatus"
===== QTREE-STATUS =====
Volume  Tree  Style  Oplocks  Status  ID  Owning vfiler
---------------------------------------
vol3           unix enabled normal  0
vol3    ETPR   ntfs enabled normal  26
vol3    Sharepoint$ ntfs enabled normal  27
vol3    fmcdata_fmccommon ntfs enabled snapvaulted  12
```

Each entry that has a "Tree" name, will have a security "Style" compare that to volume above. In this case "vol3" has file system security style of "unix" however has Qtree security styles of "ntfs" so this volume & its qtrees do not match.

```
DTO = "quotaTreeStatus"
===== QTREE-STATUS =====
Volume  Tree   Style  Oplocks  Status  ID  Owning vfiler
-----------------------------------------------------------
ebill01         mixed  enabled  normal  0   vfiler0
ebill01 oracle  mixed  enabled  normal  1   vfiler0

Any Qtree (entry with "Tree" name) that has a "Style" of "mixed"
```

```
File Systems: DF Section of auto support
===== DF =====
Filesystem    kbytes       used         avail        capacity  Mounted on
/vol/vol3/    6245843240   4095208736   2150634504   66%       /vol/vol3/

From quotas.gz file in autosupport email, not part of autosupport content.

Qtrees: Max only
#Auto-generated by setup Wed Nov 1 17:10:36 GMT 2006
/vol/Private/Privdir       tree   17077216K   -      -      -      -      -
/vol/Private/Profiles      tree   49085920K   -      -      -      -      -
/vol/Private/ps4profiles   tree   -           -      -      60G    -
# ~ quota: can't stat file /vol/Private/ps4profiles: No such file or directory (/et
/vol/Private/users         tree   -           -      -      1024G  -
/vol/Misc/ediu001          tree   40G         -      -      -      -
/vol/Misc/Desktop          tree   425G        -      -      -      -
/vol/GroupDir/IS           tree   200G        -      -      -      -
/vol/Misc/archive          tree   15G         -      -      -      -
/vol/edi/gis               tree   15G         -      -      -      -
/vol/edi/cyclone           tree   12G         -      -      -      -
/vol/edi/ediclust          tree   10G         -      -      -      -
/vol/edi/cycclust          tree   5G          -      -      -      -
/vol/Misc/UPSDATA          tree   1000M       -      -      -      -
/vol/Misc/ftp_data_drop    tree   25G         -      -      20G    -
/vol/Misc/ceds             tree   60G         -      -      -      -
/vol/Misc/tmw              tree   5G          -      -      4G     -
/vol/Misc/OnBase           tree   10G         -      -      -      -
/vol/Misc/ceds_test        tree   10G         -      -      -      -
```

First column after tree is Quota max size this is the only value we need care about, the other columns are things like hard & soft file counts etc. Note there are two examples in red where no size is specified, the user will have to ask the customer for this information and Atlas must allow the user to enter this value in order to create the "planned" file system size on the EMC.

*FIG. 17*

XIV

WARNING MESSAGES:

A: THIS ITEM WILL NOT BE MIGRATED, THE BUSINESS NEED WILL NEED TO BE SATISFIED BY A DIFFERENT METHOD. IN EITHER CASE THEY WILL NOT BE SUBJECTED TO A NAS MIGRATION.
 - FOR SNAP MIRROR THIS WOULD USUALLY BE NAS REPLICATION
 - FOR SNAP VAULT IT COULD BE EITHER BACKUP OR NAS REPLICATION

B: NO MIGRATION OF DATA FROM FILE SYSTEM WILL OCCUR, THE BUSINESS NEED WILL HAVE TO BE SATISFIED BY A DIFFERENT METHOD.

C: USER WILL HAVE TO SEEK CUSTOMER ASSISTANCE IN DETERMINING "CURRENT" QTREE SIZE WITH ONE OF THE FOLLOWING METHODS:
 1. WINDOWS SHARE PROPERTIES
 2. UNIX ROOT #DF

D: NO MIGRATION OF DATA FROM QTREE WILL OCCUR, THE BUSINESS NEED WILL HAVE TO BE SATISFIED BY A DIFFERENT METHOD.

E: COMPRESSION OR DEDUPLICATION IS ENABLED ON THIS FILE SYSTEM, THE PLANNED FILE SYSTEM MUST BE LARGE ENOUGH FOR REHYDRATED DATA AFTER MIGRATION. USERS SHOULD ENSURE PLANNED FILE SYSTEM IS OF SUFFICIENT SIZE BEFORE MIGRATION OF FILE SYSTEM.

NOTE: DUE TO THE LARGE SIZE OF THE DECISION TREE, THIS FIGURE IS PRESENTED TO ILLUSTRATE AN OVERALL STRUCTURE, AND PORTIONS THEREOF MAY BE ILLEGIBLE. PREVIOUS FIGURES ILLUSTRATE ENLARGED VERSIONS OF THE DEPICTED SECTIONS.

AUTOMATIC FILE SYSTEM MIGRATION TO A NETWORK ATTACHED STORAGE SYSTEM

FIELD

The field relates generally to data storage systems, and more particularly to techniques for automatic file system migration to a network attached storage (NAS) device or system.

BACKGROUND

Migration planning and operations for a data storage system, such as, for example, a network attached storage (NAS) device or system, involve coordination of a significant amount of migration planning and specification of parameters for a target environment. In known approaches, a user is required to specify a source and new shares and exports, as well as ensuring the new shares and exports exist before beginning a migration operation. A user also needs to ensure that appropriate common Internet file source (CIFS) servers and file systems exist on the new data storage system.

These tasks require a lot of manual work for a user, and there are added complexities when not migrating from like to like data storage systems when there is not a direct mapping. For example, a user has to migrate permissions and change security based on permissions. Some examples of the tasks or components that require scripts can include file systems, mounts, CIFS shares, network file system (NFS) exports, and CIFS servers. Presently, a variety of different tools are used to generate the scripts that the user would need in order to migrate to a new data storage system, such as an NAS device or system.

Accordingly, there is a need for automated systems and methods which reduce the number of tools and the work required by a user to manually create a large amount of target configurations.

SUMMARY

Embodiments of the invention provide techniques for automatic file system migration to a network attached storage (NAS) device or system.

For example, in one embodiment, a method comprises the following steps. A first network attached storage system and a second network attached storage system are designated. A file system on the first network attached storage system is selected to migrate to the second network attached storage system, at least one criterion of the file system on the second network attached storage system is defined, and a configuration of the second network attached storage system is automatically determined based on the defined criterion.

In another embodiment, a computer program product is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, the embodiments of the present invention provide techniques for automatic file system migration to a network attached storage (NAS) device, whereby a user can simply specify source file systems and certain target criteria and a processor(s) model and/or script a target NAS configuration, and generate scripts for migration of data, users and/or shares. Embodiments of the invention can also identify file systems which cannot be automatically migrated, and set the identified file systems to a status of not migrating. In this case, a user can choose to either manually migrate those file systems, or override the status of not migrating and automatically detect a target file system. Rules are used to automatically identify information, warning and error conditions so they can be handled appropriately.

These and other features and advantages of the present invention will become more readily apparent from the accompanying drawings and the following detailed description.

BRIEF DESCRIPTION OF THE DRAWINGS

FIG. 3 illustrates a decision tree providing an example of analysis in a migration between two different types of NAS systems in accordance with an embodiment of the present invention.

FIG. 4 illustrates an enlarged portion I of the decision tree from FIG. 3.

FIG. 5 illustrates an enlarged portion II of the decision tree from FIG. 3.

FIG. 6 illustrates an enlarged portion III of the decision tree from FIG. 3.

FIG. 17 illustrates an enlarged portion XIV of the decision tree from FIG. 3.

DETAILED DESCRIPTION

Figure 1:
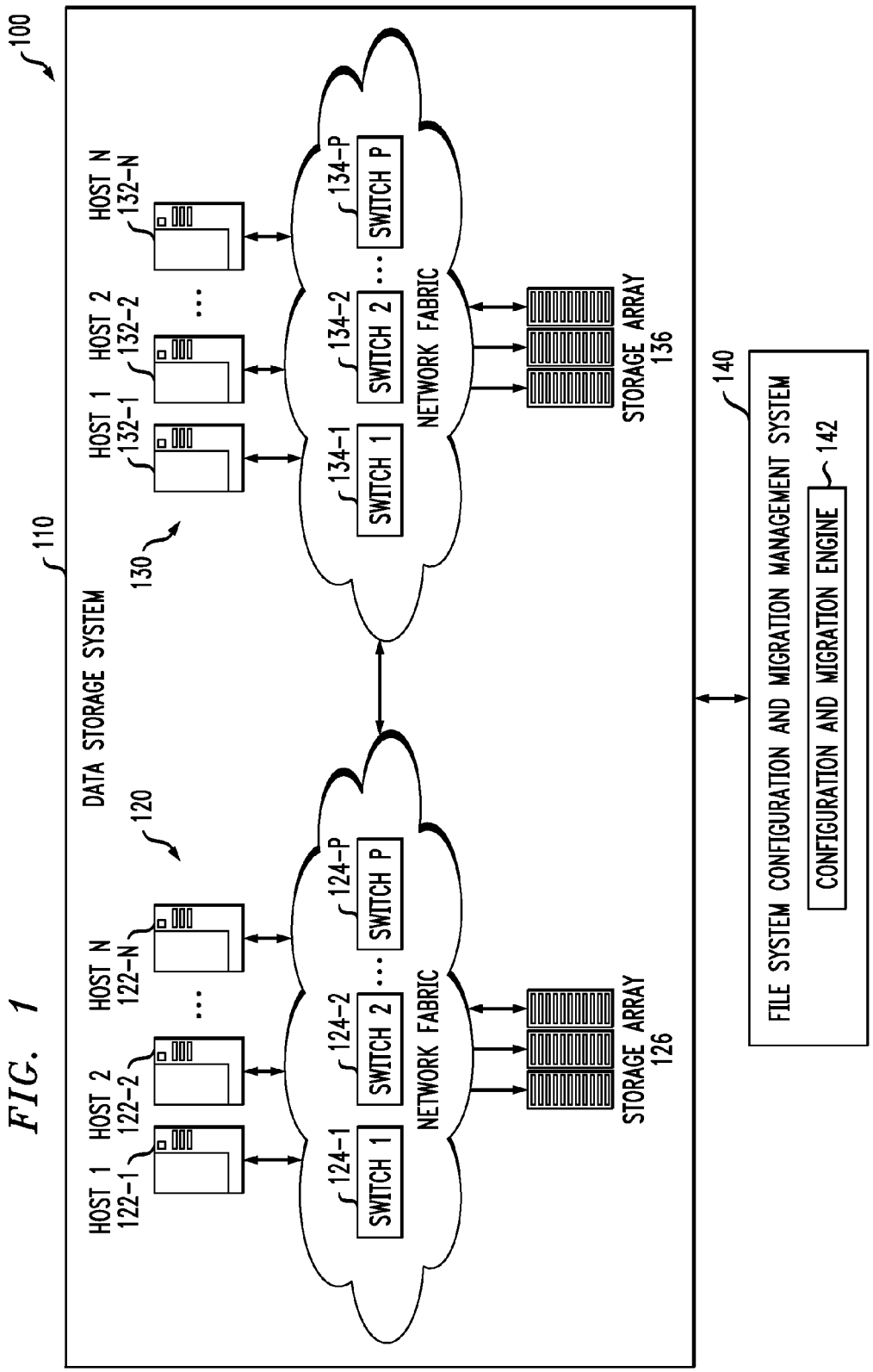
FIG. 1 shows a data storage environment with a file system configuration and migration management system according to an embodiment of the invention.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "file system" refers to the way in which files are named and where they are placed logically for storage and retrieval. For example, the DOS, Windows®, OS/2®, Macintosh®, and UNIX®-based operating systems all have file systems in which files are placed somewhere in a hierarchical (tree) structure. A file is placed in a directory or subdirectory at the desired place in the tree structure.

As used herein, the term "volume" refers to an identifiable accessible storage area with a file system, typically (though not necessarily) resident on a single partition of a hard disk.

As used herein, the term "qtree" refers to a subdirectory or subset in a volume, for example under the root volume directory, that acts as a virtual subvolume with special attributes, primarily quotas and permissions. A qtree can create a subset of a volume to which a quota can be applied to limit its size. A qtree is a folder which can contain both files and sub-folders, and those sub-folders can contain both files and sub-sub-folders, etc.

As used herein, the term "shares" refers to a directory or directory structure that has been made available to network users to enable access of files from a connected host and can be mapped to a drive letter on a CIFS client.

As used herein, the term "exports" refers to a directory or directory structure that has been made available to network users to enable access of files from a connected host and can be mapped to a NFS client.

As used herein, the term "snapmirrored" refers to NetApp® volume with SnapMirror® enabled, which is a data replication technology for disaster recovery. "Snapmirrored" refers to when a replica is created using NetApp® SnapMirror® for a volume or qtree.

As used herein, the term "snapvaulted" refers to NetApp® volume with SnapVault enabled, which is a data replication technology for backup. "Snapvaulted" refers to when a replica is created using NetApp® SnapVault®, which allows Windows® and UNIX® hosts to backup data to a NetApp® filer and store any file system changes in a snapshot.

As used herein, the term "root" refers to an attribute of a NetApp® volume. More specifically, root refers to the attribute designating which volume in a system is used for booting and loading the NetApp® operating system. Root also refers to an origin point of a file system's structure; the highest level in the hierarchy of folders or directories.

As used herein, the term "diskroot" refers to an attribute of a NetApp® volume. More specifically, diskroot refers to an attribute designating which volume in the system will be used at the next system restart for booting and loading the NetApp operating system. Diskroot, or the root volume on a NetApp®, contains system files and configuration information, and can also contain data. It is required for a system to be able to boot and to function properly. Core dump files, which are used for troubleshooting, are written to the root volume if there is enough space.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric, Ethernet, etc.), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric, Ehternet, etc.), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (LUNs). Thus, each subsystem can have both logical execution components and physical execution components. Also, it is to be understood that each storage array may have one or more physical storage devices associated therewith.

Also shown in system environment 100 is a file system configuration and management system 140. The management system 140 is a computer-based tool used by administrators of the data storage system 110 to automatically configure file systems and other parts of an NAS array in order to migrate the source file systems to the target file systems within the data storage system. Data can be, for example, acquired, distributed, and/or migrated from storage array 126 in subsystem 120 to storage array 136 in subsystem 130, or vice versa. In accordance with an embodiment of the present invention, the storage arrays 126 and 136 are NAS arrays. Also, data may need to be acquired, distributed and/or migrated from one storage array to another storage array within the same subsystem. Reasons for the data acquisition, distribution and/or migration are applicationdependent, but could be driven by data and resource management decisions made by the infrastructure provider.

The management system 140 includes a configuration and migration engine 142, which controls analysis of file systems on an existing (source) storage array which are to be migrated to a new (target) storage array, determination of required configurations for migration, the creation of exports and shares, script and message generation, determination of migration options and the identification of file systems which cannot automatically be migrated. The foregoing is not necessarily an exhaustive list of the capabilities of the configuration and migration engine.

Advantageously, embodiments of the present invention provide techniques for automatic file system migration to a network attached storage (NAS) device or system. Embodiments of the present invention enable a user and/or processor to specify file systems on an existing (source) NAS and migrate to a new (target) NAS. By default, it is assumed that all file systems in the source NAS can be automatically migrated to a file system on the target NAS. In accordance with embodiments of the present invention, where necessary, it is possible to select options in order for the migration to proceed automatically.

Figure 2:
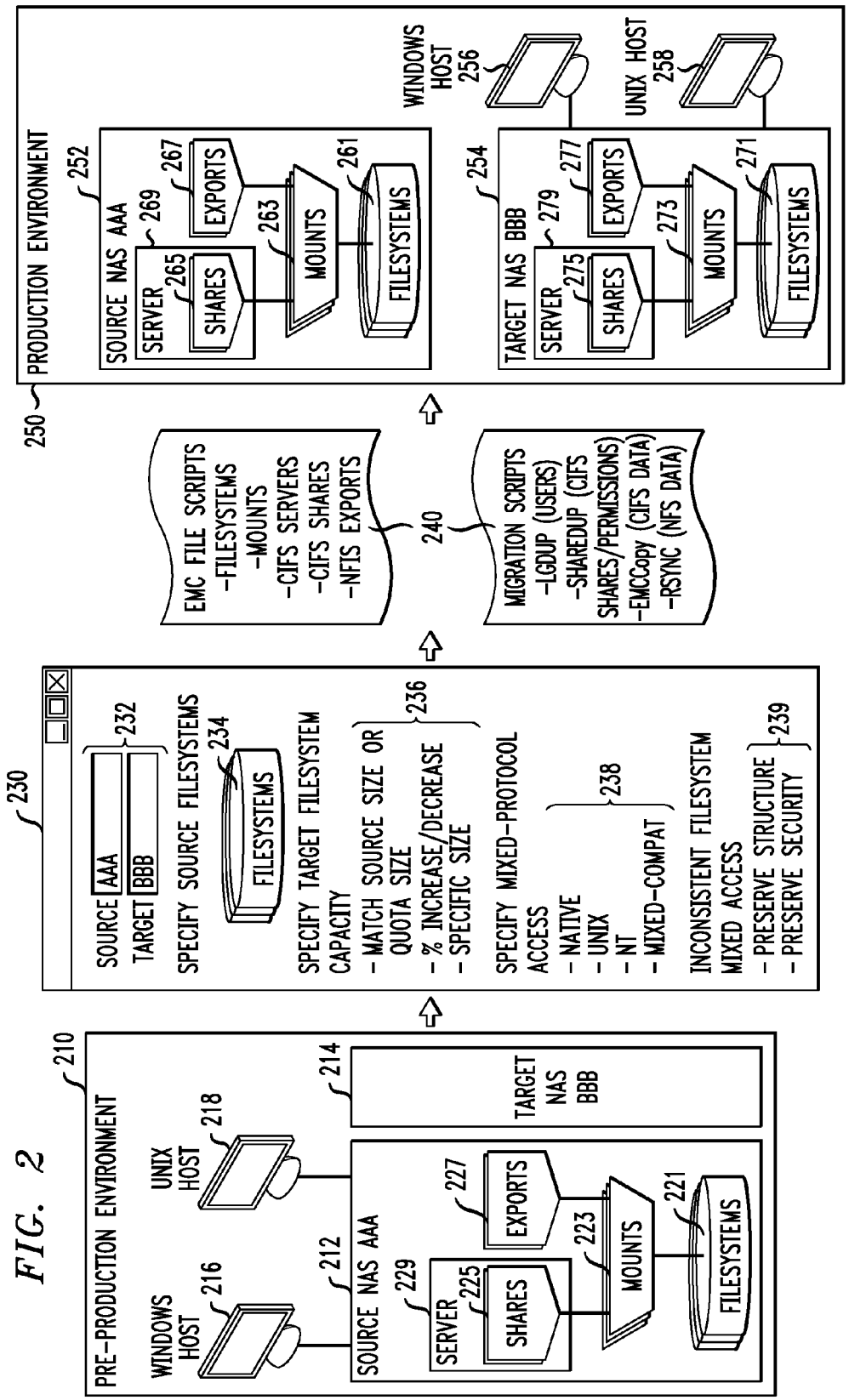
FIG. 2 is a block diagram illustrating an operation of an embodiment of the present invention in connection with a migration from a source to a target NAS.

FIG. 2 is a block diagram illustrating an operation of an embodiment of the present invention in connection with a migration from a source to a target NAS. Referring to FIG. 2, a pre-production environment 210 includes an existing source NAS 212, and a target NAS 214. Similarly, the production environment 250 includes the source NAS 252 and target NAS 254. The source NAS 212 in the pre-production environment 210 is consumed by both hosts 216 and 218 (e.g., a UNIX® and a Windows® host). The source NAS 212 includes file systems 221, mounts 223, shares 225, exports 227 and a server 229. The target NAS 214 has no defined configuration in the pre-production environment 210. Through a graphical user interface (GUI) 230, a user and a processor are able to specify the source and target NAS in fields 232, and select one or more source file systems 234 that are in scope for a migration. Through additional fields or prompts, the user and processor can define characteristics of a target file system (e.g., size 236, mixed-protocol access policy 238, and inconsistent file system mixed access policy 239) so that the configuration and migration engine 142 can determine the target NAS configuration.

The configuration and migration engine 142 has enough information to model the target NAS configuration and also define the scripts 240 necessary to migrate the file system data using migration software, such as, for example, RSync (UNIX®) and EMCopy (Windows®). There are also scripts 240 created to copy user groups from the source NAS to the target NAS (using, e.g., LGDUP) along with common Internet file system (CIFS) shares and permissions (using, e.g., SHAREDUP).

Now, referring to the production environment 250, once all the scripts 240 have been generated and run on the target environment 250, the hosts 256, 258, which previously consumed the file data from the source NAS 252 can seamlessly cut-over to the target NAS 254 once the data has been migrated. Like the source NAS 212 in the pre-production environment 210, the source NAS in the production environment includes file systems 261, mounts 263, shares 265, exports 267 and a server 269. The target NAS 254, which has no defined configuration in the pre-production environment 210 includes file systems 271, mounts 273, shares 275, exports 277 and a server 279 in the production environment 250. In the production environment, the source NAS 252 could be cleaned up automatically, removing file systems 261, mounts 263, shares 265, exports 267 and server 269 by generating additional scripts 240.

As used herein, "criteria" refers to the options (or criterion when referring to one option) that can be selected in order for the migration to proceed automatically. In accordance with an embodiment of the present invention, where a source file system cannot be migrated automatically and it is not possible to use criteria, the source file system is set to not migrating and a target file system is not automatically assigned. When completing a migration of like to like NAS systems, criteria may not need to be used, and it may not be necessary to exclude file systems from a migration. Criteria are often used when migrating between two different types of NAS systems where there is no direct mapping, e.g. NetApp® to EMC®.

The decision tree in FIG. 3 provides an example of complexities and analysis involved in a migration between two different types of NAS systems in accordance with an embodiment of the present invention. The complexities are not however limited to what is listed in the decision tree. It is to be noted that due to the size of the decision tree, FIG. 3 is presented to illustrate an overall structure, and portions thereof may be illegible. However, subsequent FIGS. 4-17 respectively illustrate enlarged versions of sections I-XIV of the decision tree in FIG. 3.

Users and/or processors may choose to mark a file system to "not migrating," choosing not to migrate a file system for a variety of reasons, including but not limited to, that the customer has no data on those file systems or the data has no business value and does not need to be migrated.

Figure 18:
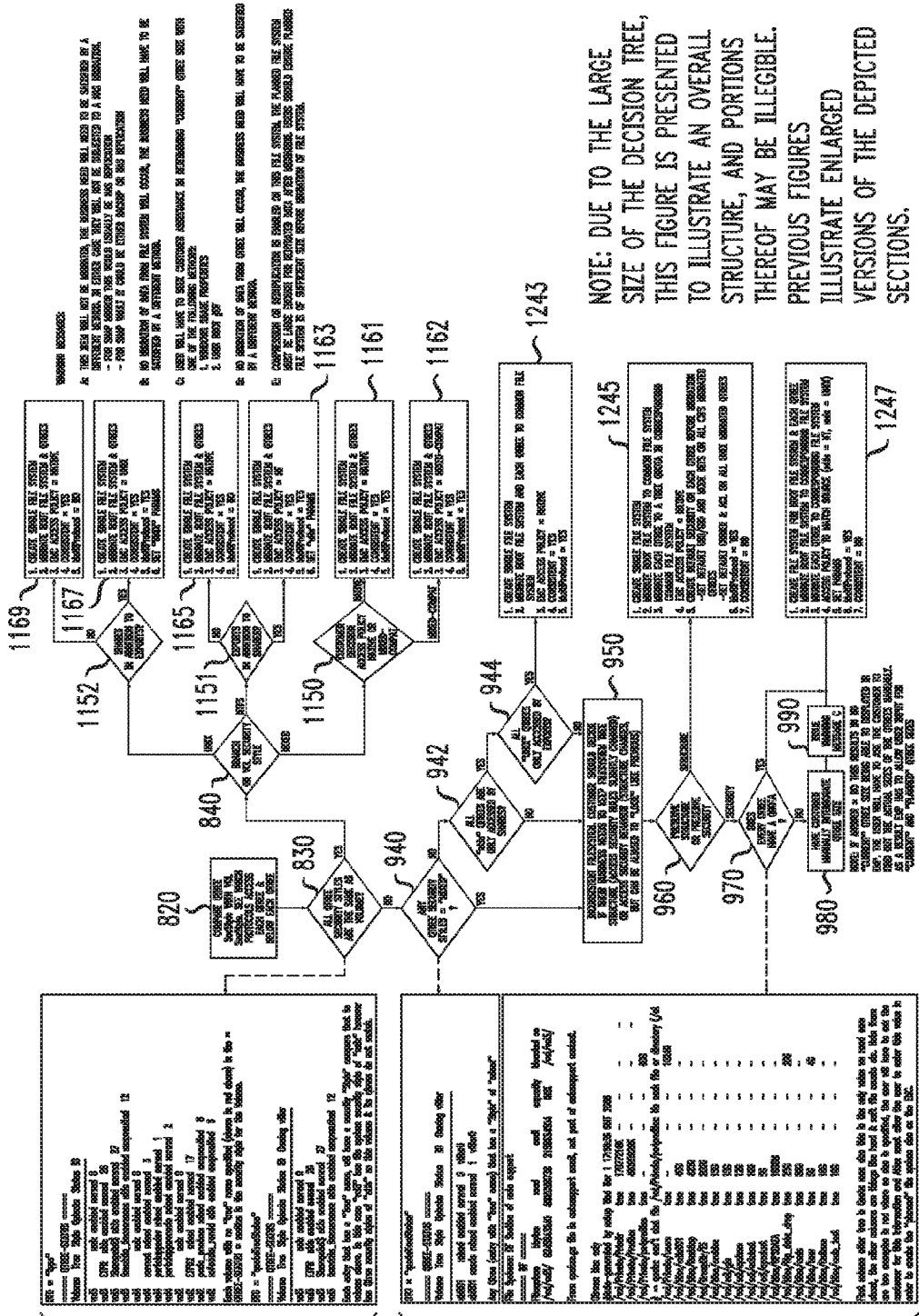
FIG. 18 illustrates a section of the decision tree from FIG. 3 used for determining when criteria are to be used in accordance with an embodiment of the present invention.

FIG. 18 illustrates a section of the decision tree from FIG. 3 used for determining when criteria are to be used in accordance with an embodiment of the present invention. As can be seen, FIG. 18 includes part of sections II, V, VIII and IX, and all of sections III, VI and XIV from FIG. 3. Enlarged versions of sections II, III, V, VI, VIII, IX and XIV are respectively illustrated in FIGS. 5, 6, 8, 9, 11, 12 and 17.

Referring to the figures, each file system is checked for structure, security and other inconsistencies that may exist, e.g., capacity not set on the source file system. More specifically, referring to blocks 810 and 820 of FIG. 8, after scanning qtrees, and marking qtrees with logical units (or logical unit numbers) (LUNs) for exclusion, qtree security style (SecStyle) is compared with volume (Vol) SecStyle to determine which protocols access each qtree and below each qtree. As used herein, below each qtree refers to files in a lower level in the folder hierarchy under the qtree. Access to data is not restricted to the folder which is the qtree. It is queried at block 830 whether any qtree SecStyles are the same as volume. If no at block 830, it is further queried at block 940 of FIG. 9 whether any qtree SecStyles are mixed. If yes at block 940, then there is a determination of an inconsistent file system at block 950, at which point a customer decides whether the business needs to keep the file system tree structure (access security rules slightly change) or keep the access security behavior (structure changes, but can be aliased to look like previous structure). At block 960, it is determined whether to preserve structure or security. If structure at block 960, then the method proceeds to task block 1245 in FIG. 12. The task blocks in FIGS. 11 and 12, in general, specify how to create and/or migrate a file system, root file system and qtrees and define access policies and security.

If security at block 960, then it is queried whether every qtree has a quota at block 970. If no at block 970, a customer manually interrogates qtree size at block 980, and at block 990, warning message C is issued, which states that a user has to seek customer assistance in determining current qtree size (see FIG. 17). If yes at block 970, then the method proceeds to task block 1247 in FIG. 12.

If no at block 940, it is determined whether all new technology file system (NTFS) qtrees are accessed by shares at block 942. If no at block 942, the method proceeds to block 950. If yes at block 942, then it is queried at block 944 whether all UNIX® qtrees are only accessed by exports. It is to be understood that references to NTFS and UNIX® are exemplary, and the embodiments of the invention are not limited to these systems. If no at block 944, the method proceeds to block 950. If yes at block 944, then the method proceeds to task block 1243 in FIG. 12.

If yes at block 830, then it is further queried at block 840 what type of branch (e.g., UNIX®, NTFS or mixed), and depending on the type of branch, certain tasks are performed. For example, referring to FIG. 11, when mixed, it is queried at block 1150 whether a native or mixed compatibility (mixed-compat) access policy is to be used, further leading to task blocks 1161 and 1162. When NTFS or UNIX, it is queried at blocks 1151 and 1152 whether there are exports in addition to shares, and depending on the answer (Yes or No), task block 1163 or 1165, or task block 1167 or 1169 is triggered.

In accordance with embodiments of the present invention, as can be understood from the figures and the written description, it is automatically determined if user input is required to continue with the automatic assignment of the target file system.

Figure 19:
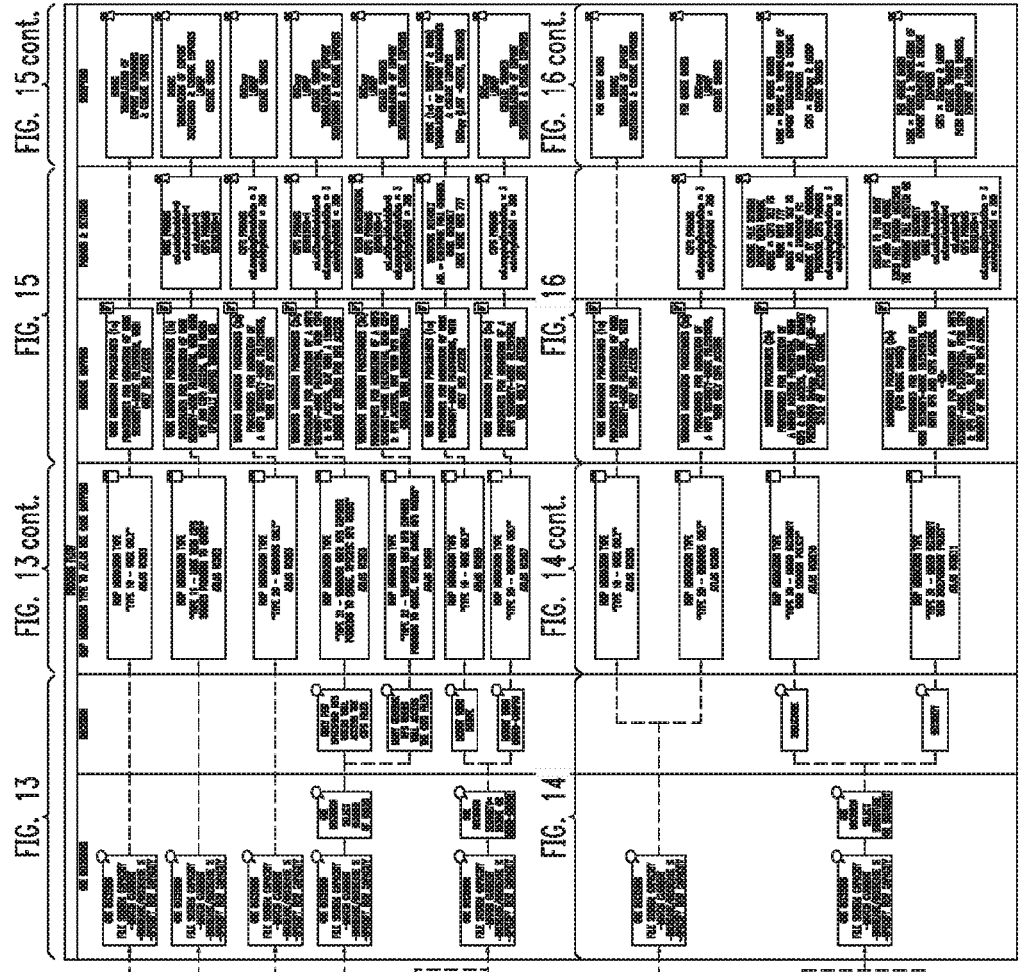
FIG. 19 illustrates graphical user interface decision columns of a process flow in accordance with an embodiment of the present invention.

Referring to FIG. 19, and the enlarged versions thereof in FIGS. 13-16, in the non-limiting example set forth herein, there are four criteria that can be entered, as can be seen in the GUI Decision columns (first and second columns) of the process flow. It is to be understood that the embodiments of the present invention are not limited to the four enumerated criteria, and that more or less criteria may be specified.

With respect to the exemplary embodiment in FIG. 19, examples of criteria that can be specified for the target NAS configuration are:

1) Target File system Capacity: By default the source file system will be the same as the target file system. The user can select to manually override the source file system capacity. In accordance with an embodiment of the present invention, when warning message C is displayed, it is mandatory to set the capacity (see, e.g., FIG. 9, block 990). In accordance with illustrative non-limiting embodiments of the present invention, a user may specify a match to the source size or quota size, as appropriate for the migration, a % increase/decrease from the source or quota size, or a specific value for the capacity.

2) Security Options for the security treatment of Mixed-protocol access: In this illustrative non-limiting embodiment, UNIX® and Windows NT® are automatically selected and do not need criteria. In mixed-protocol access, a user may specify "Native" or "Mixed-Compat."

3) Structure or Security: In this illustrative non-limiting embodiment, a selection by a user of structure or security is required when there is an inconsistent file system with mixed access options. A user may specify to preserve structure or preserve security of file system being migrated.

4) Number of users: In this illustrative non-limiting embodiment, a user may specify, for example, that only a few specified network file system (NFS) users will access common Internet file system (CIFS) files, or many general NFS users will access the CIFS files.

In accordance with the embodiments of the present invention, the criteria enable automatic migration from a source to a target file system, and can also be used to override settings on the source file system to modify the configuration of the target file system. An example of this is where a user specifies a capacity for the target file system where the capacity of the source file system exists.

In accordance with embodiments of the present invention, after the criteria are specified, a decision can be made on how a conflict can be resolved, Migration Type Mapping, Runbook Mapping, parameters and settings can be set and scripting on the target file system can be automatically determined.

Figure 20:
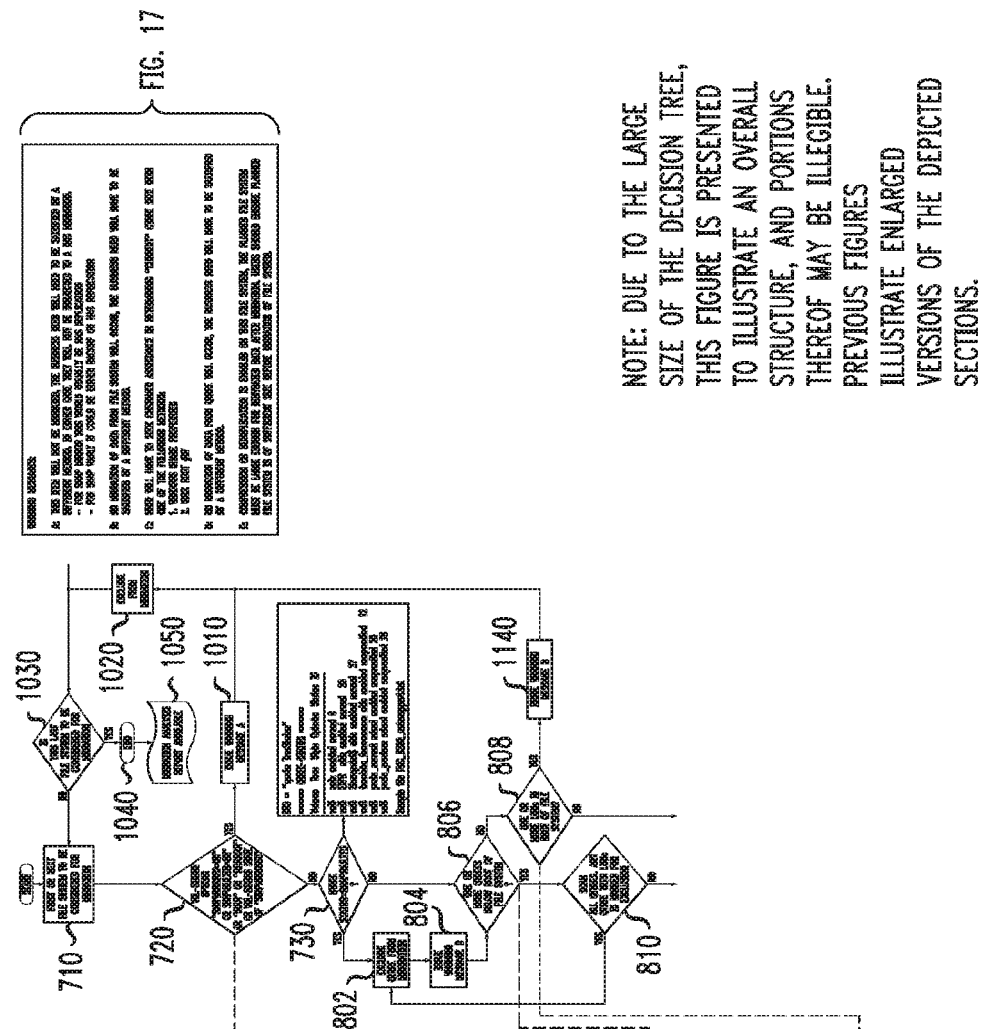
FIG. 20 illustrates a section of the decision tree from FIG. 3 used for identification of file systems that cannot be automatically migrated in accordance with an embodiment of the present invention.

Referring to the section of the decision tree in FIG. 20, in accordance with an embodiment of the present invention, a system is capable of identifying file systems which cannot be automatically migrated and set them to a status of not migrating. Typically only a small subset of all file systems cannot be automatically migrated. In the event of file systems which cannot be automatically migrated, embodiments of the present invention permit a user to choose to either manually migrate those file systems or override the status of not migrating and automatically detect a target file system. The section of the decision tree in FIG. 20 provides an example for the identification of the file systems that cannot be automatically migrated.

Figure 12:
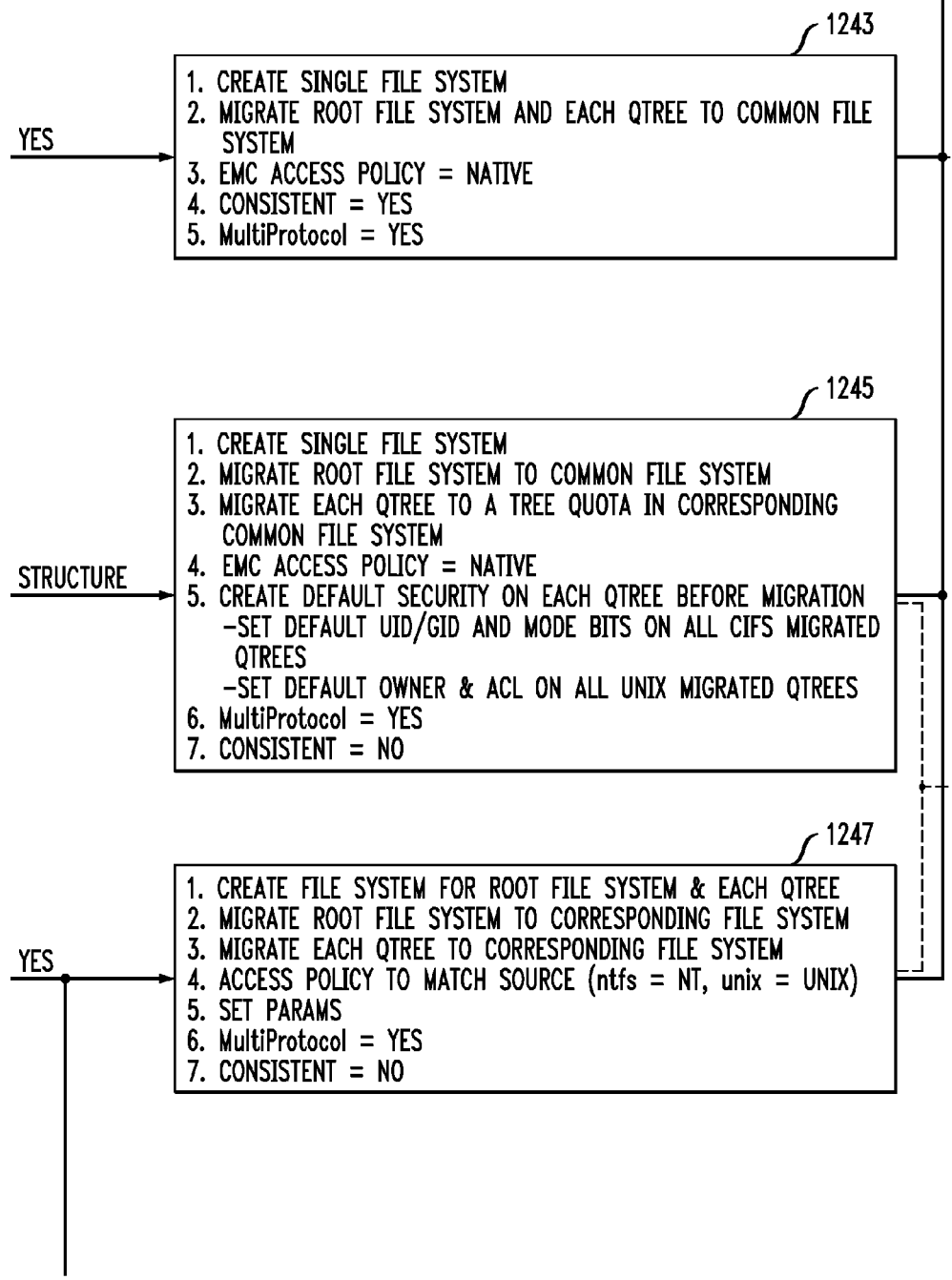
FIG. 12 illustrates an enlarged portion IX of the decision tree from FIG. 3.
Figure 13:
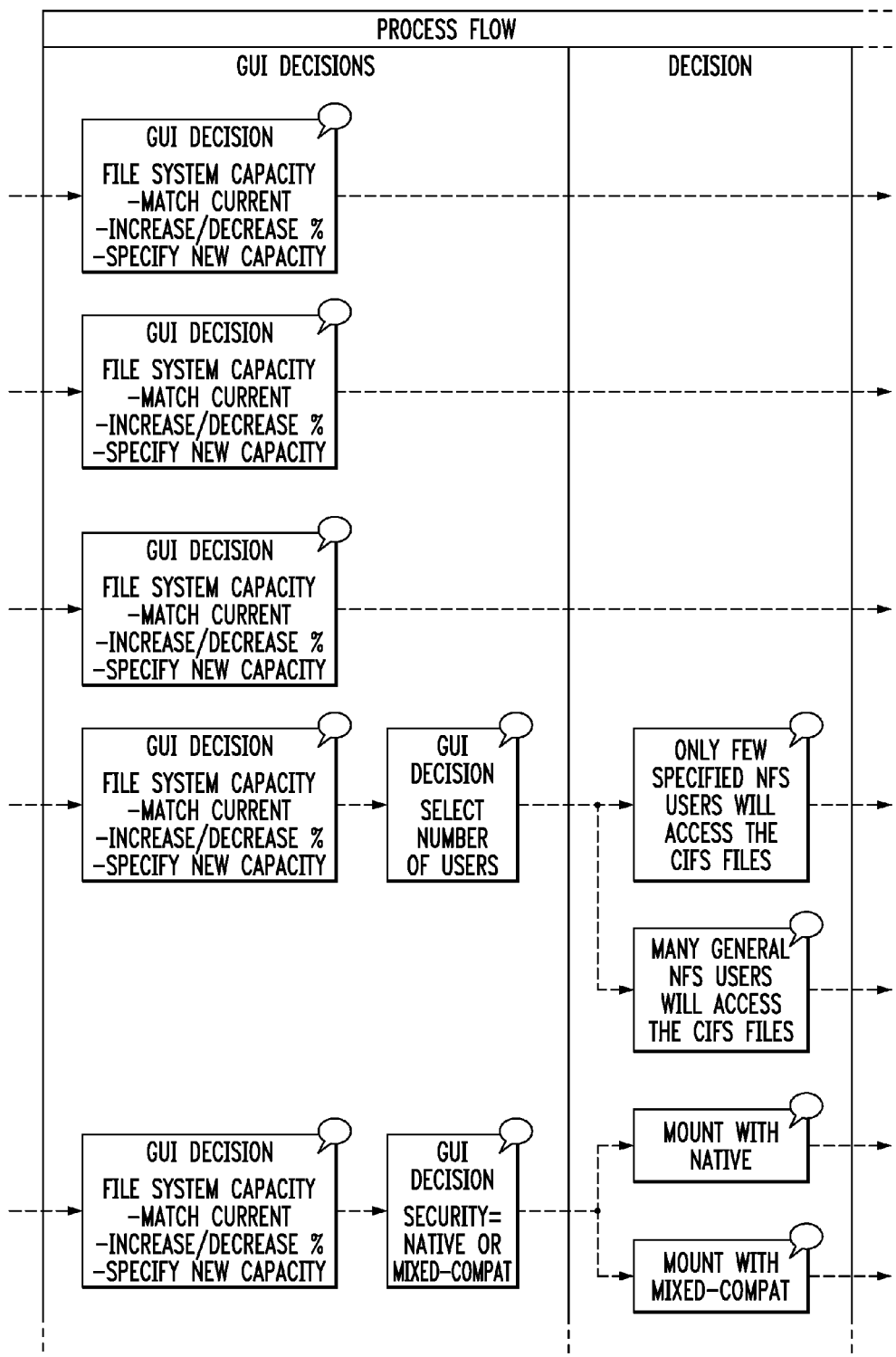
FIG. 13 illustrates an enlarged portion X of the decision tree from FIG. 3.
Figure 13:
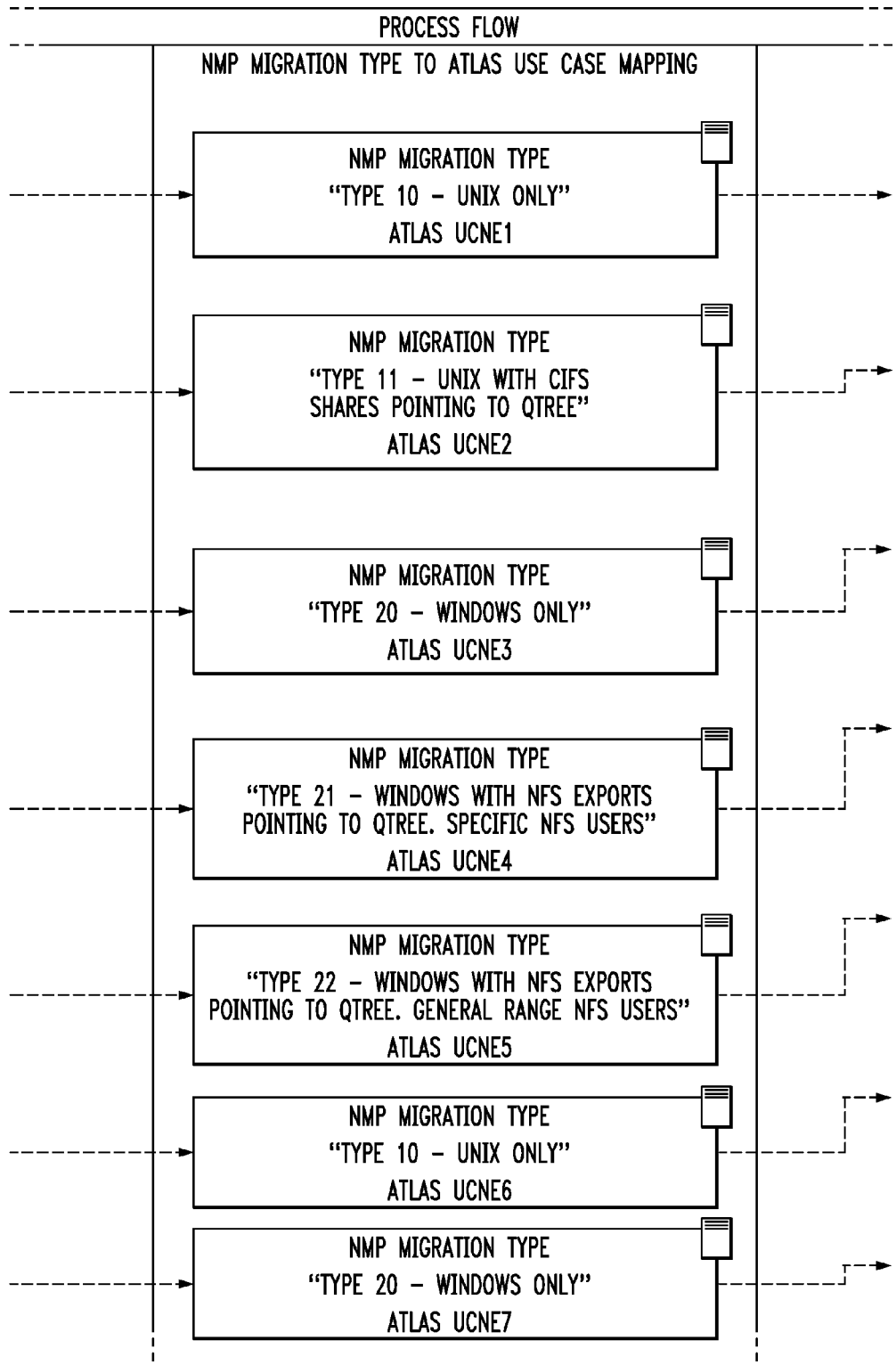
Figure 14:
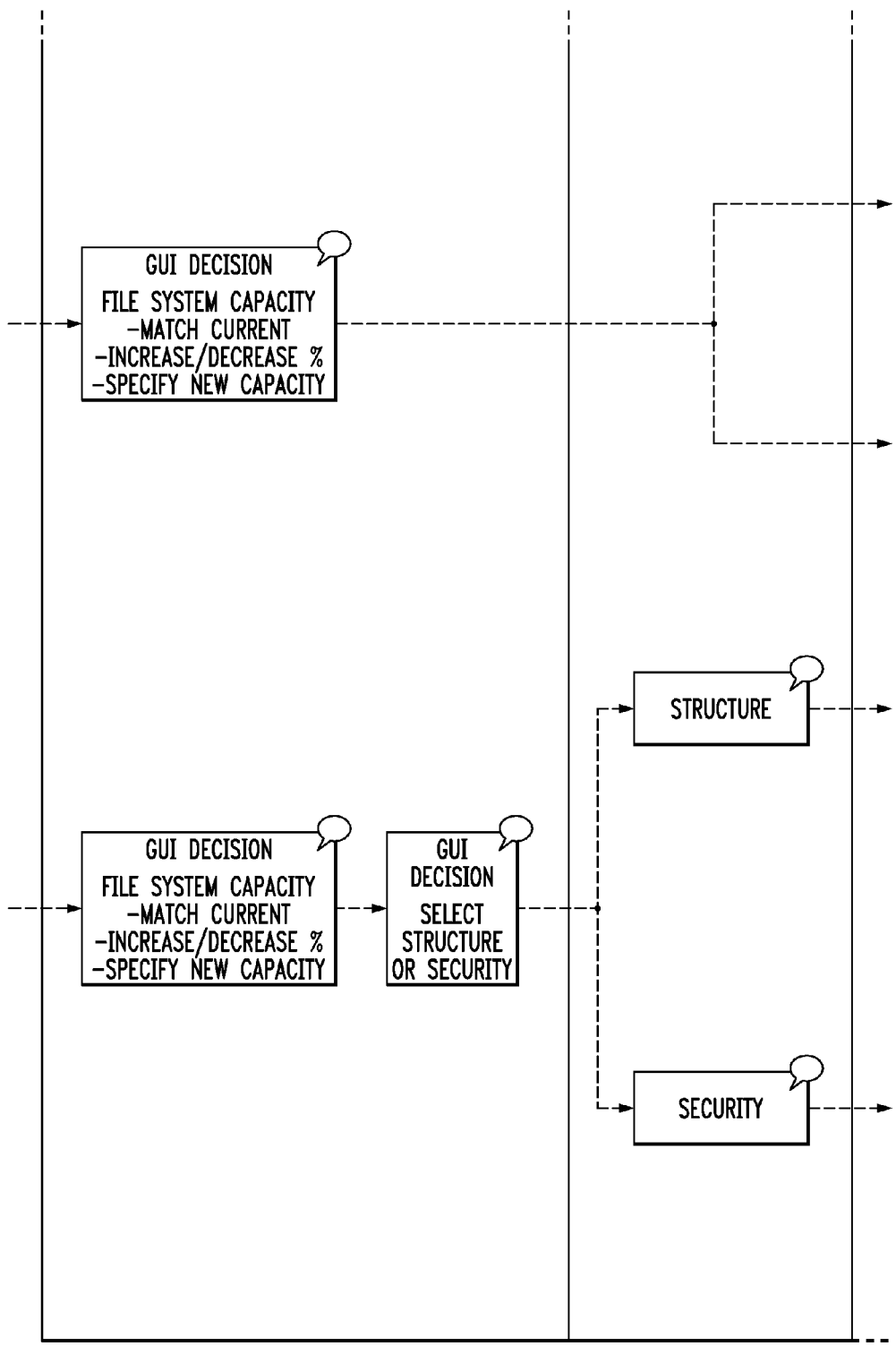
FIG. 14 illustrates an enlarged portion XI of the decision tree from FIG. 3.
Figure 14:
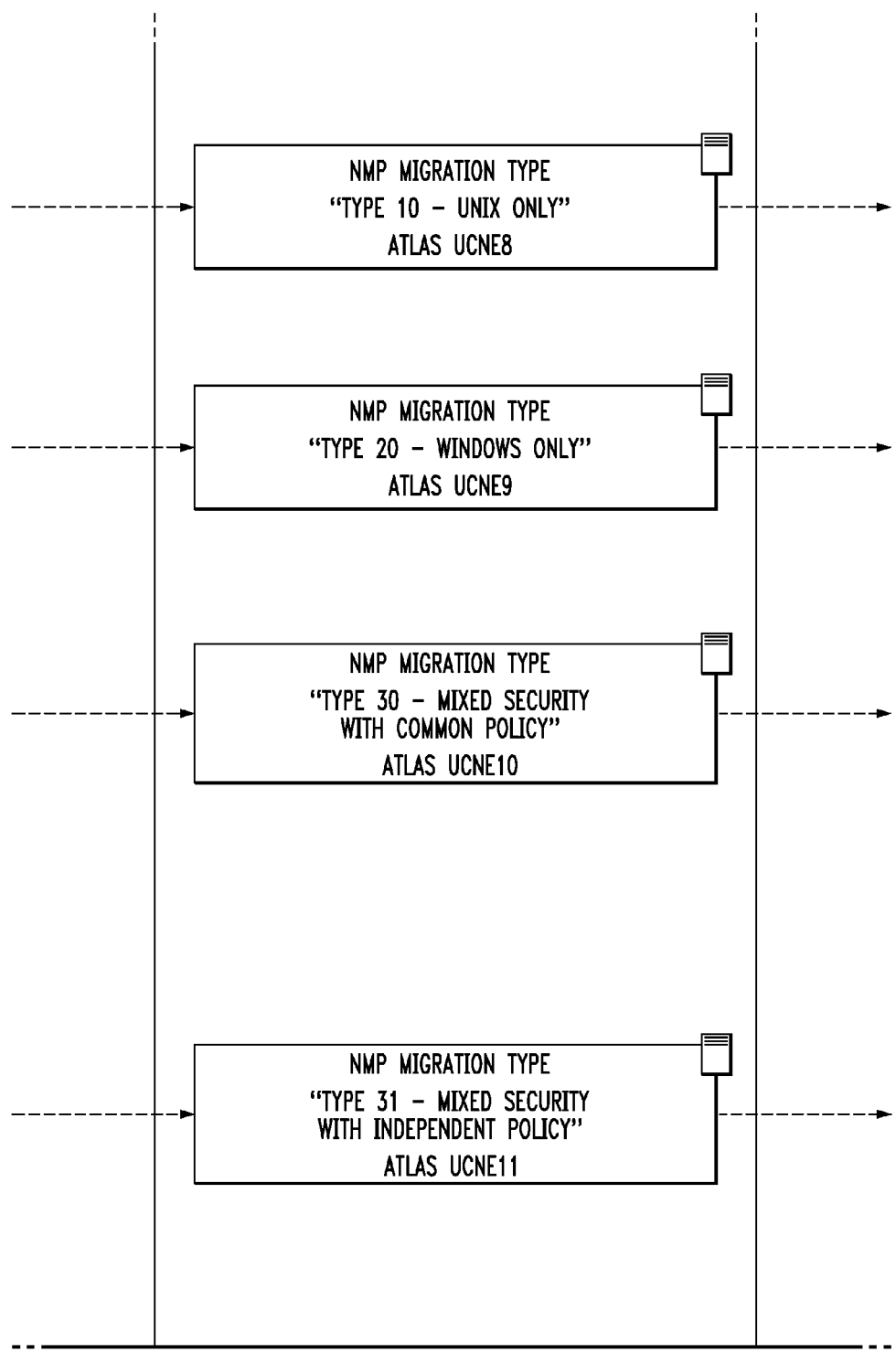
Figure 15:
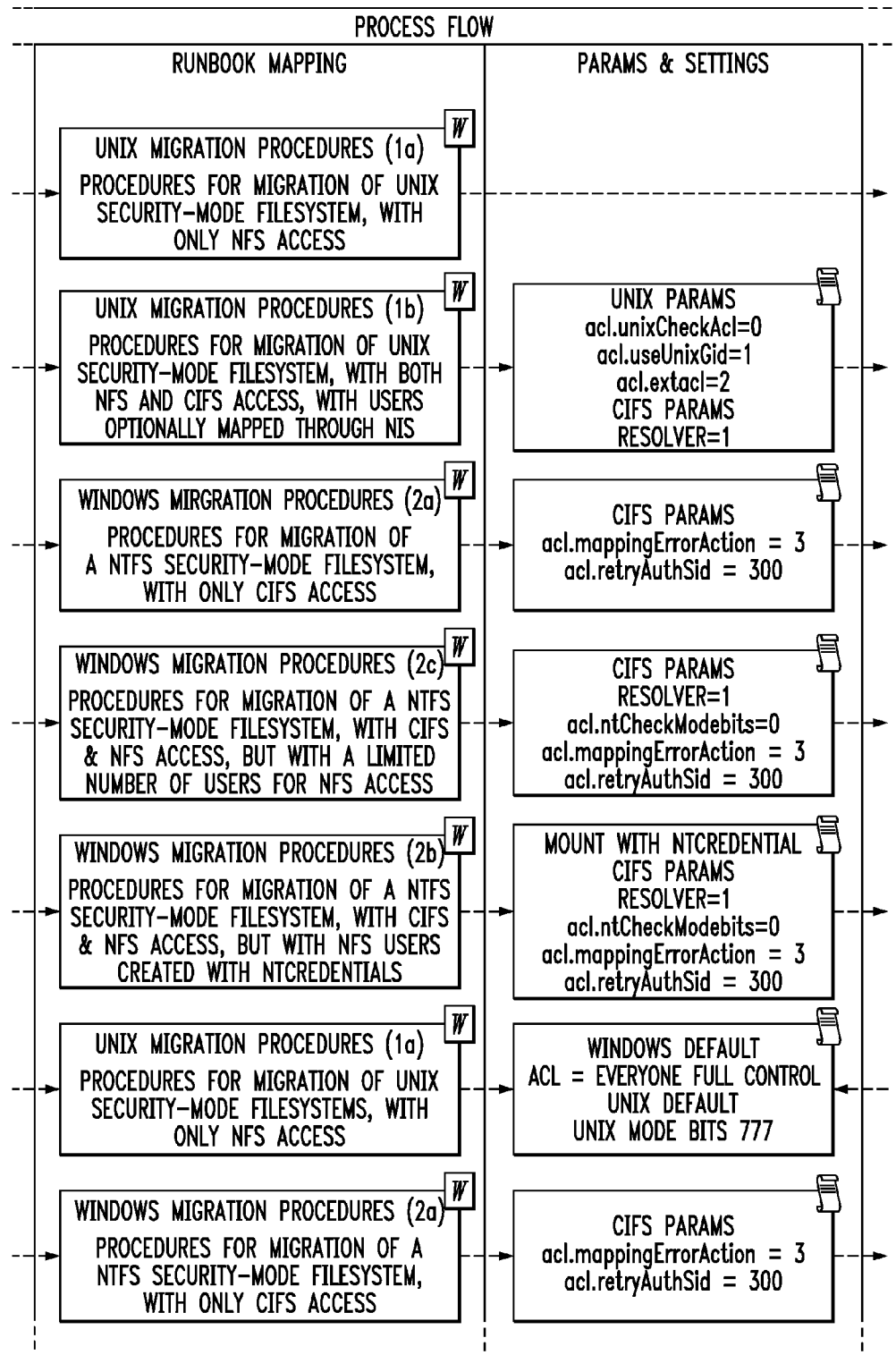
FIG. 15 illustrates an enlarged portion XII of the decision tree from FIG. 3.
Figure 15:
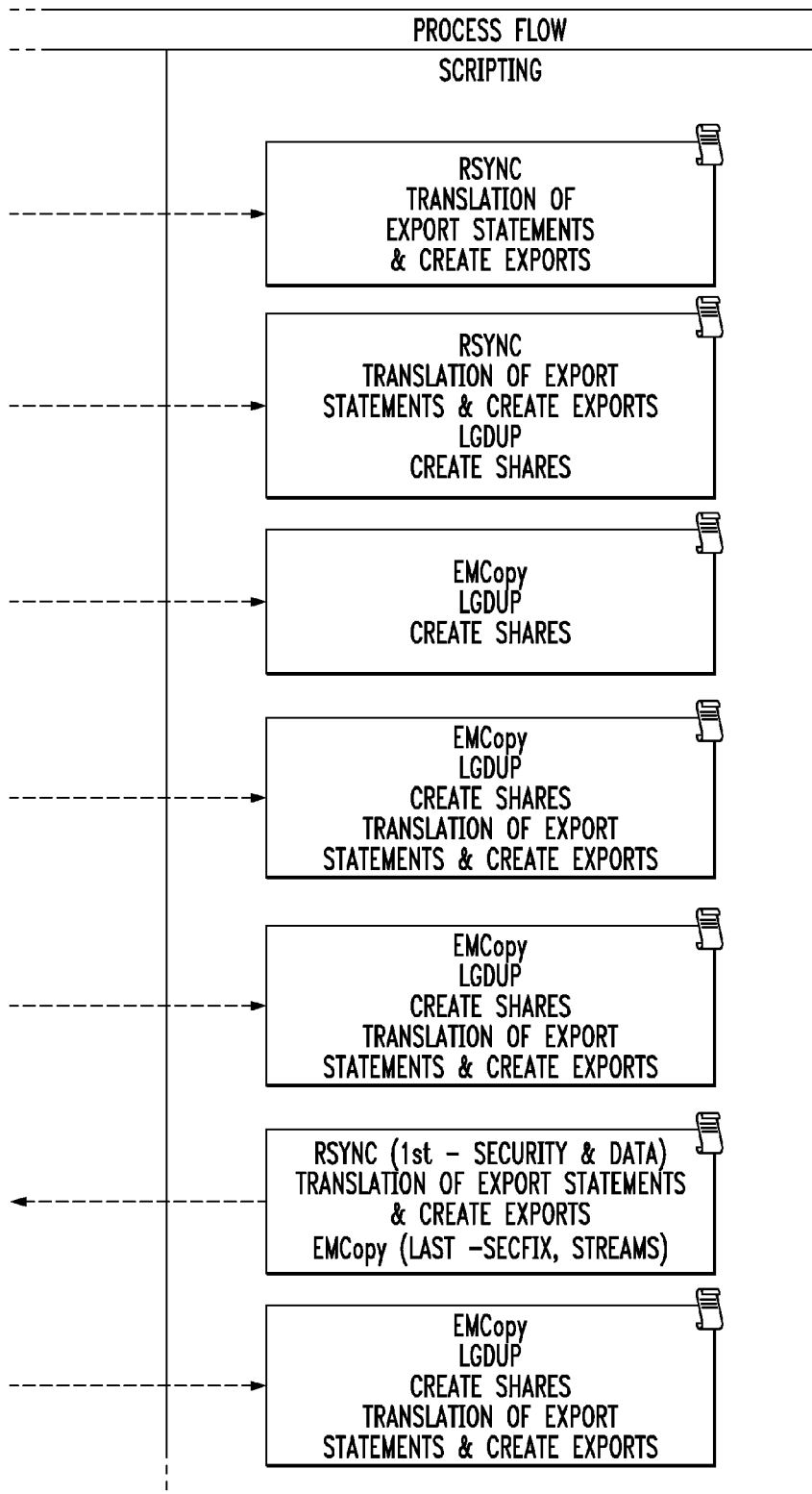
Figure 16:
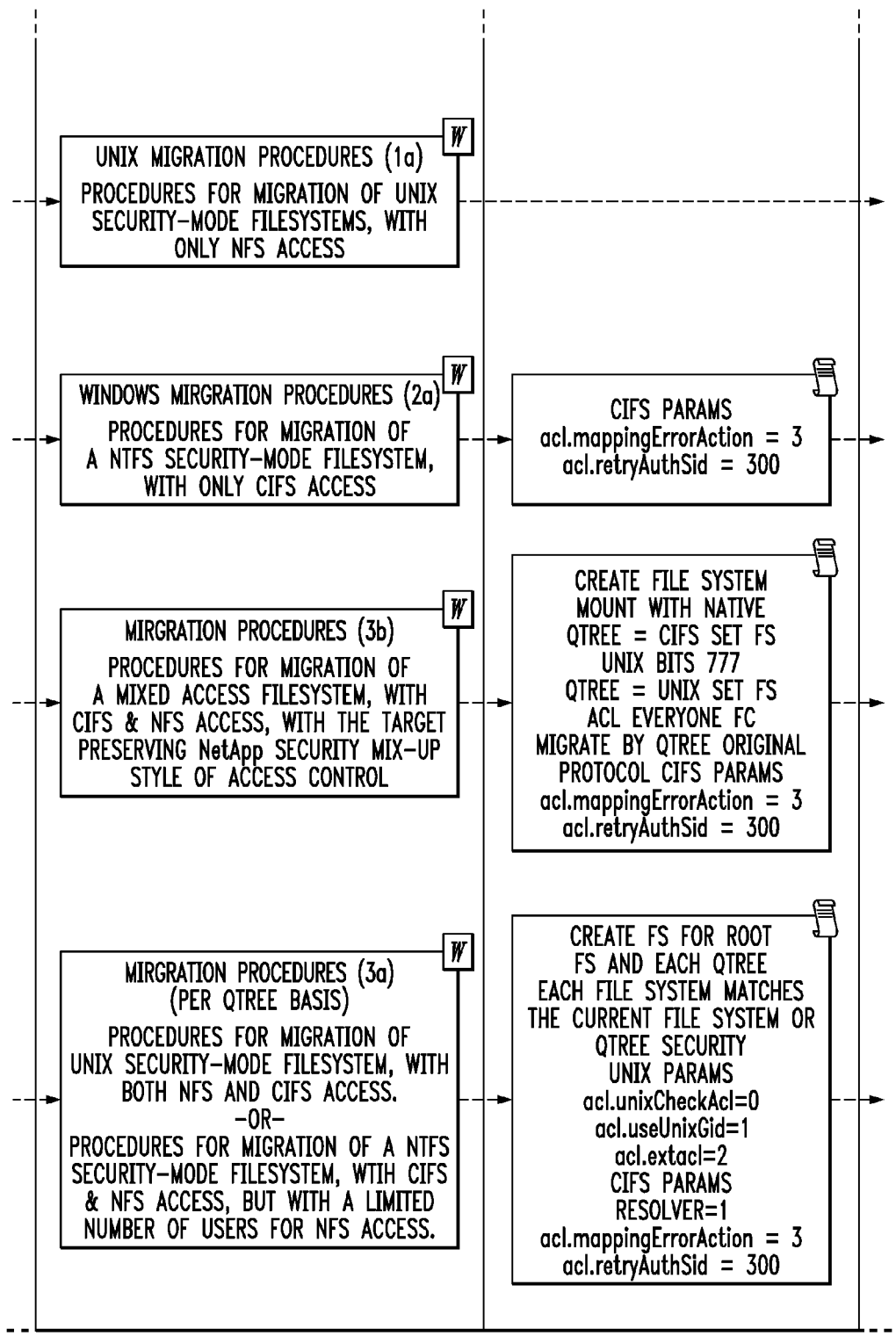
FIG. 16 illustrates an enlarged portion XIII of the decision tree from FIG. 3.
Figure 16:
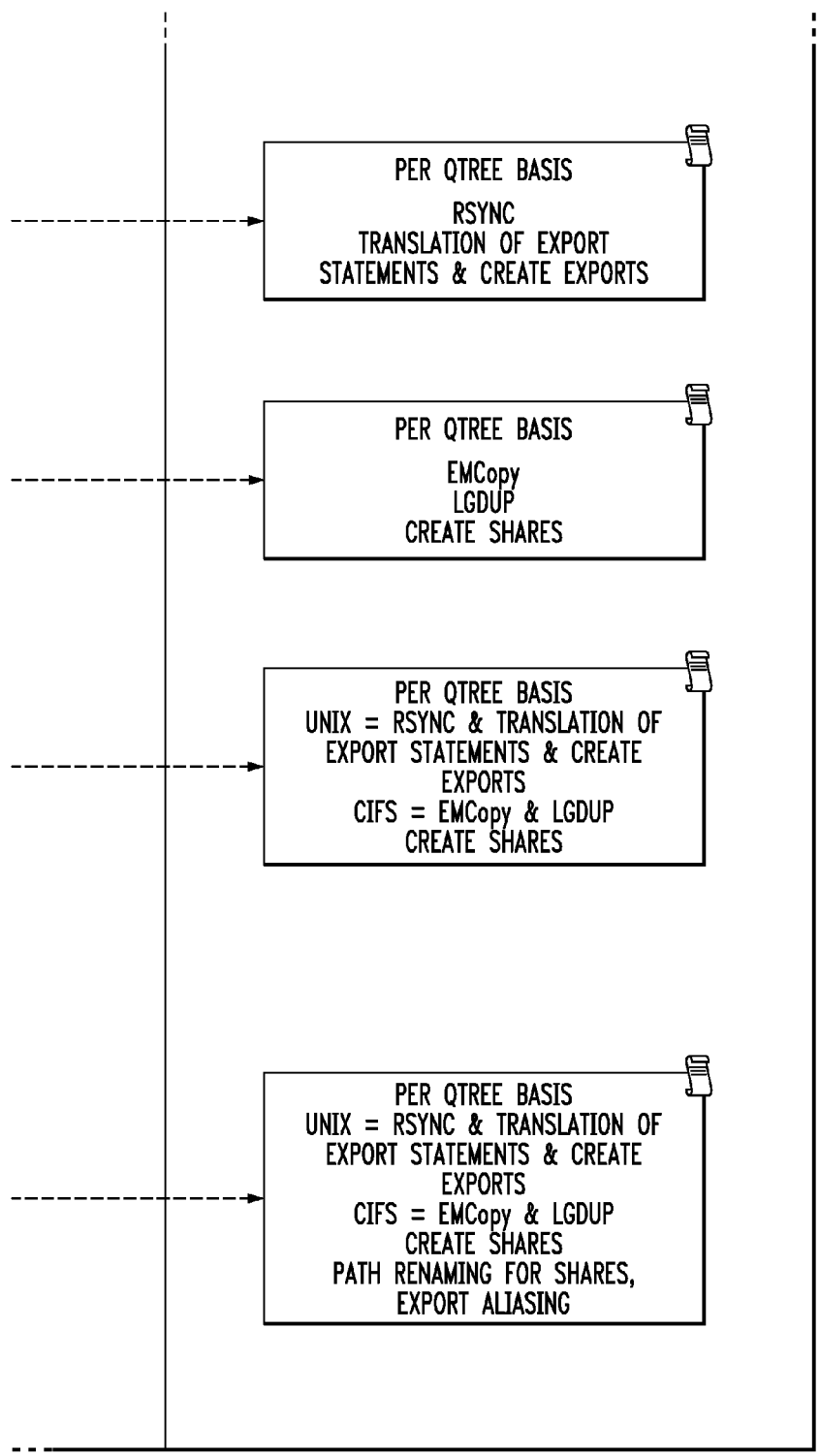

As can be seen, FIG. 12 includes part of sections I, II, IV, V, VII and VIII, and all of section XIV from FIG. 3. Enlarged versions of sections I, II, IV, V, VII, VIII and XIV are respectively illustrated in FIGS. 4, 5, 7, 8, 10, 11 and 17.

Figure 7:
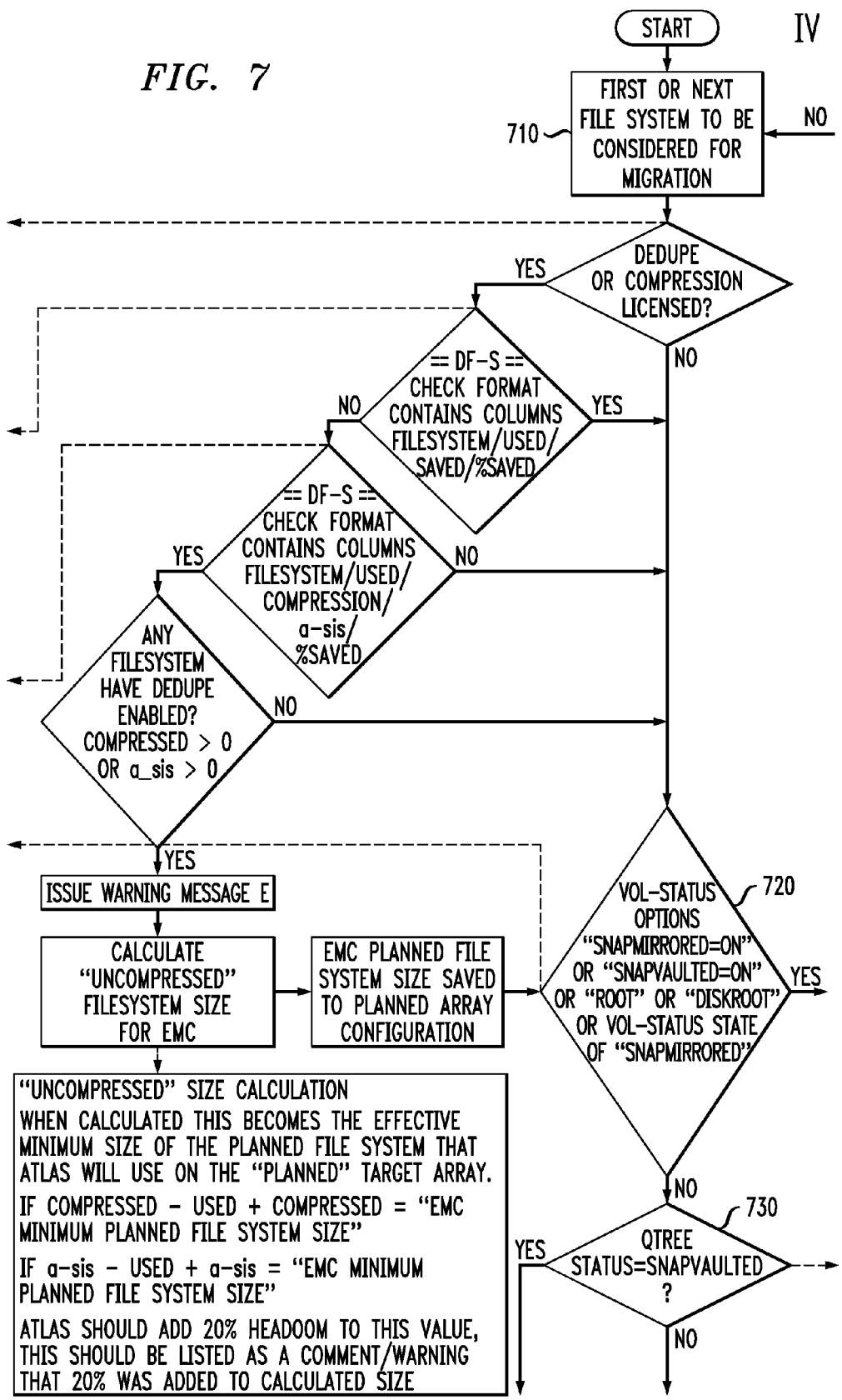
FIG. 7 illustrates an enlarged portion IV of the decision tree from FIG. 3.
Figure 8:
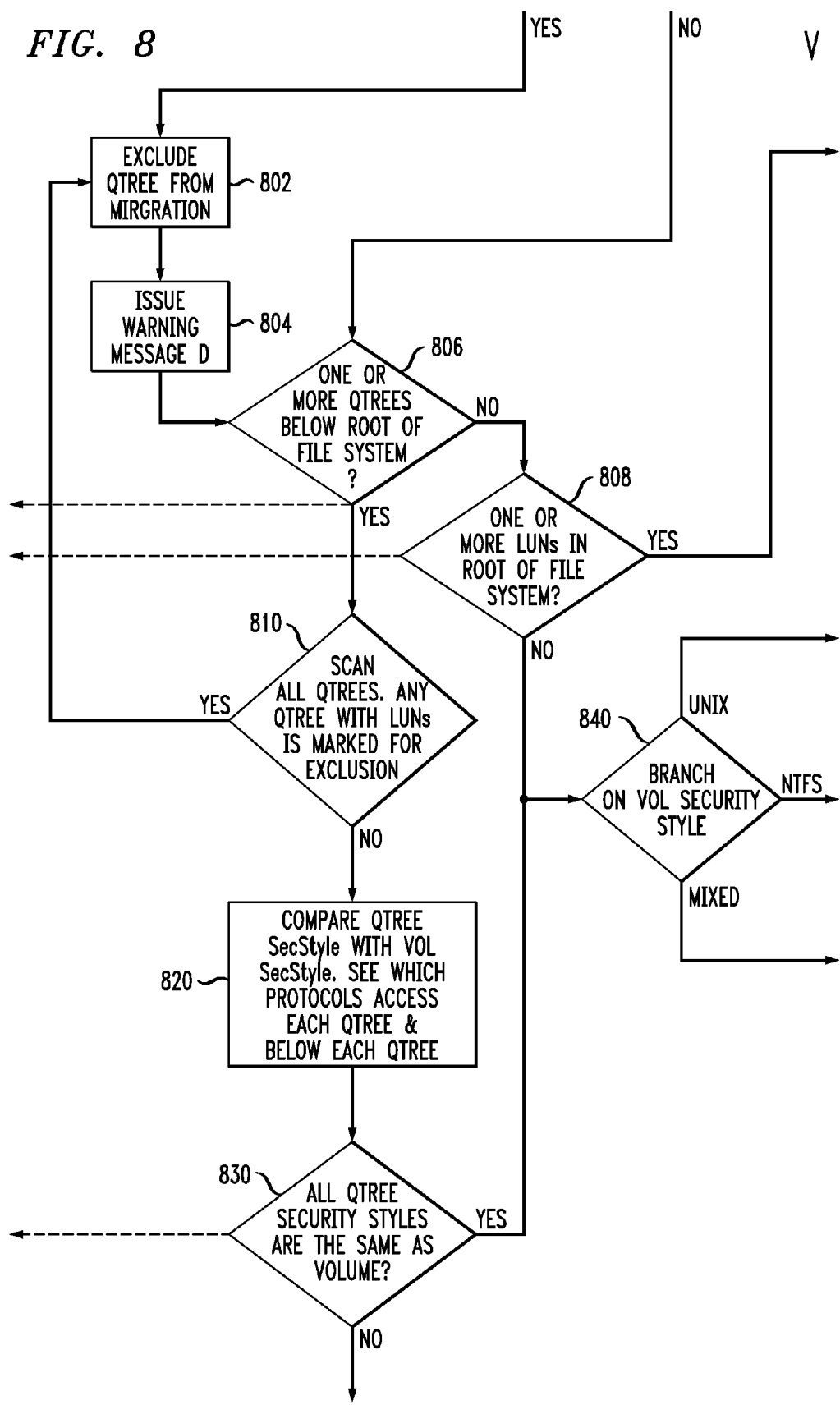
FIG. 8 illustrates an enlarged portion V of the decision tree from FIG. 3.
Figure 9:
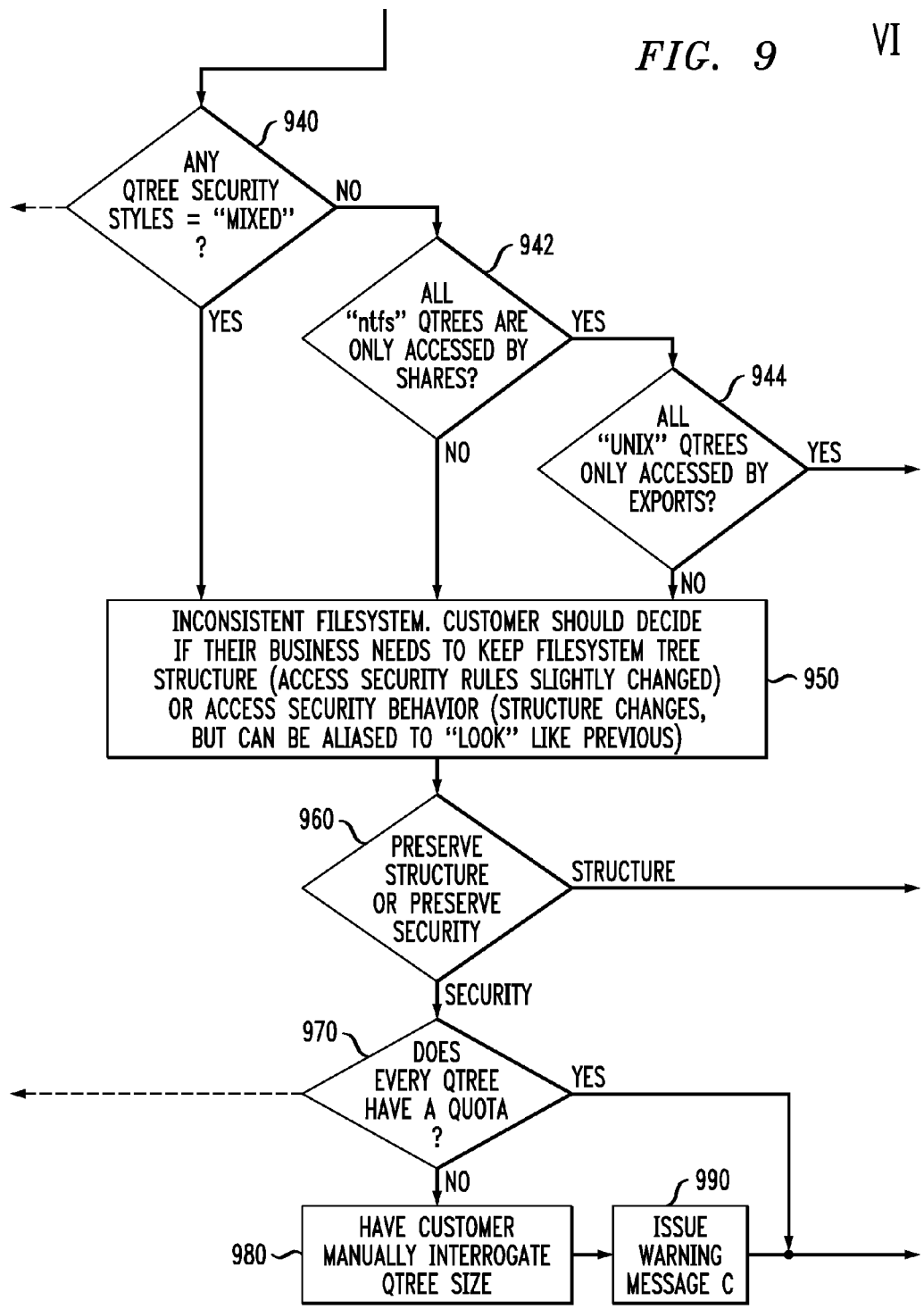
FIG. 9 illustrates an enlarged portion VI of the decision tree from FIG. 3.
Figure 10:
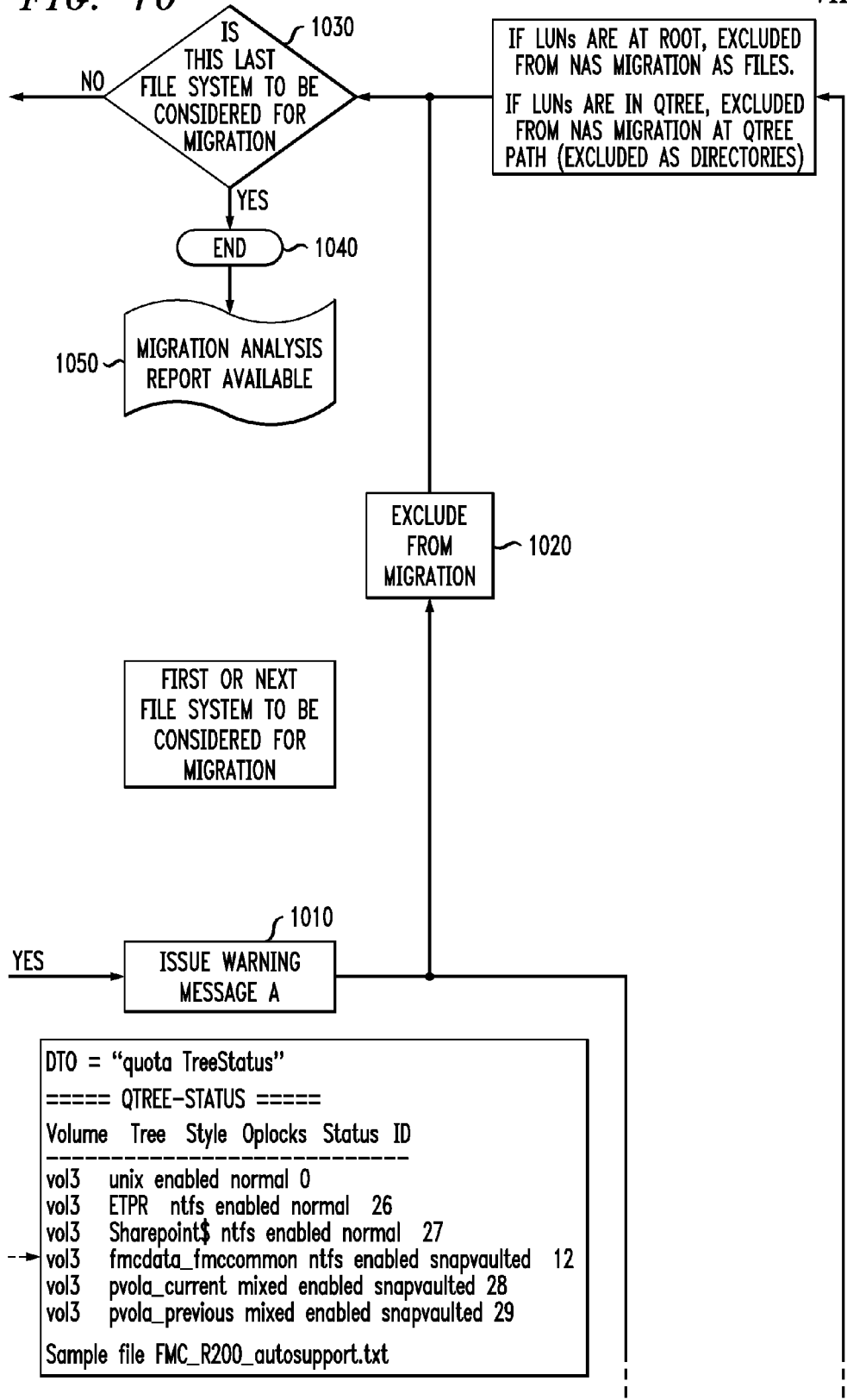
FIG. 10 illustrates an enlarged portion VII of the decision tree from FIG. 3.
Figure 11:
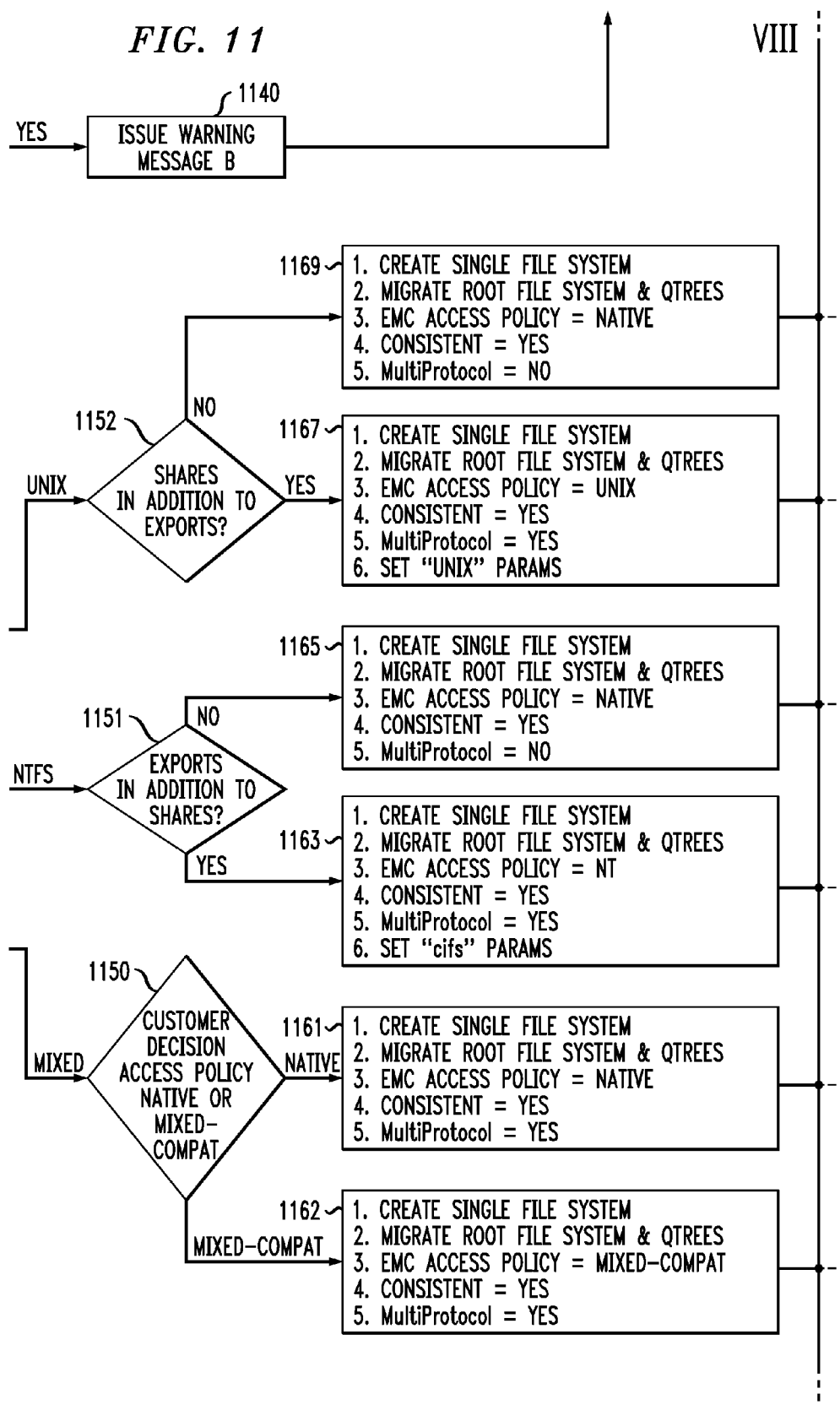
FIG. 11 illustrates an enlarged portion VIII of the decision tree from FIG. 3.

Referring to FIG. 7, at block 710, the first or the next file system is considered for migration. At block 720, it is determined whether the file system Vol-Status is "snapmirrored=on", "snapvaulted=on", "root", or "disk-root", or whether the Vol-Status state is equal to "snapmirrored". If yes at block 720, the method proceeds to block 1010 in FIG. 10, where warning message A is issued, which states that the item will not be migrated, and that the business need will be satisfied by a different method (see FIG. 17). The method then proceeds to block 1020, where the file system is excluded from migration, and to block 1030, where it is queried whether the previously analyzed file system is the last file system to be considered for migration. If yes at block 1030, the flow ends at block 1040, and a migration analysis report is generated and made available to a user at block 1050. If not at block 1030, the method returns to block 710.

If no at block 720, the method proceeds to block 730, where it is queried whether the qtree status is equal to "snapvaulted". If yes at block 730, the method proceeds to block 802 in FIG. 8, where the qtree is excluded from the migration, and to block 804 where warning message D is issued. Warning message D states that no migration data from a qtree will occur, and that the business need will have to be satisfied by a different method. Then the method proceeds to block 806, where it is queried whether one or more qtrees are below the root of the file system. As used herein, since root refers to an origin point of a file system's structure; the highest level in the hierarchy of folders or directories, "below the root of the file system" refers to all remaining folders and sub-folders (including those which are qtrees). If no at block 730, the method also proceeds to block 806.

If yes at block 806, the method proceeds to block 810, where qtrees are scanned, and any qtree with LUNs is marked for exclusion. If no at block 806, the method proceeds to block 808, where it is queried whether one or more LUNs are in the root of the file system. If yes at block 808, warning message B is issued at block 1140 in FIG. 11.

Warning message B states that no migration of data from the file system will occur, and the business need will have to be satisfied by a different method. Then, the method proceeds to block 1020, which is described above. If no at block 808, the method proceeds to block 840, which is described above.

Applying the portion of the decision tree in FIG. 20, in accordance with an embodiment of the present invention, there are 3 different warning messages that can be generated when it is automatically detected that the file systems will be excluded from migration, and manual intervention will be required.

For example, where there is one or more qtrees below a root of a file system which has a LUN, warning message D is displayed, and the file system is excluded from migration. Where there is not a qtree below a root of a file system which has a LUN, warning message B is displayed, and the file system is excluded from migration.

Referring to block 720, if the file system Vol-Status is one of the following options; "snapmirrored=on", "snapvaulted=on", "root", "diskroot", or a Vol-Status state is equal to "snapmirrored", warning message A is displayed, and the file system is excluded from migration.

In accordance with an embodiment of the present invention, by default issuance of warning A, warning B and warning D will set the status of the file system to not migrating. In accordance with an embodiment of the present invention, for these warnings or any other condition which prevents a file system from being automatically migrating, a user can override the not migrating status in order to automatically assign a target file system. The file system will continue to generate the warnings which can be reviewed at any stage during the migration.

According to an embodiment of the present invention, file systems, mounts, CIFS server, CIFS shares and NFS exports will be automatically modeled and scripts generated. The scripts necessary to migrate the data/local users and shares/share permissions between the source and target NAS are also automatically generated. This significantly reduces the amount of manual work involved for the user when migrating large numbers of file systems. In accordance with embodiments of the present invention, reports, runbooks, configuration guides and other outputs are also generated to assist a user with the migration. Examples include: (i) configuration guides and runbooks, which help an implementation specialist while completing the migration; (ii) exception reports, which give a list of information, warning and error conditions that should be reviewed as part of planning and implementing the migration; (iii) a project management report, which gives an overall status of the migration; and (iv) an environment report, which could be used to present an existing configuration of the source and target NAS and the updates that are going to be made in the migration.

Embodiments of the present invention are not limited to file system migration. For example, it may also be necessary to analyze and migrate other parts of an NAS array in order to migrate the source file systems to the target file systems. For example, users and groups may need to be analyzed and migrated. If a group that exists on a source array has different user members on the target array, then migration of the group from the source to the target should be managed appropriately. Similar principles can be applied to users and groups as for file systems. In accordance with an embodiment of the present invention, migrating users and groups may be completed separately from migrating file systems as users and groups may only be migrated once and used for all file systems.

The embodiments of the present invention are not limited to a 1:1 migration. For example, embodiments of the present invention may also be applied to a 1:n, n:1 and n:n migration. Embodiments of the present invention can also be applied to moving a file system within a single NAS, e.g., from one data mover to another.

Figure 21:
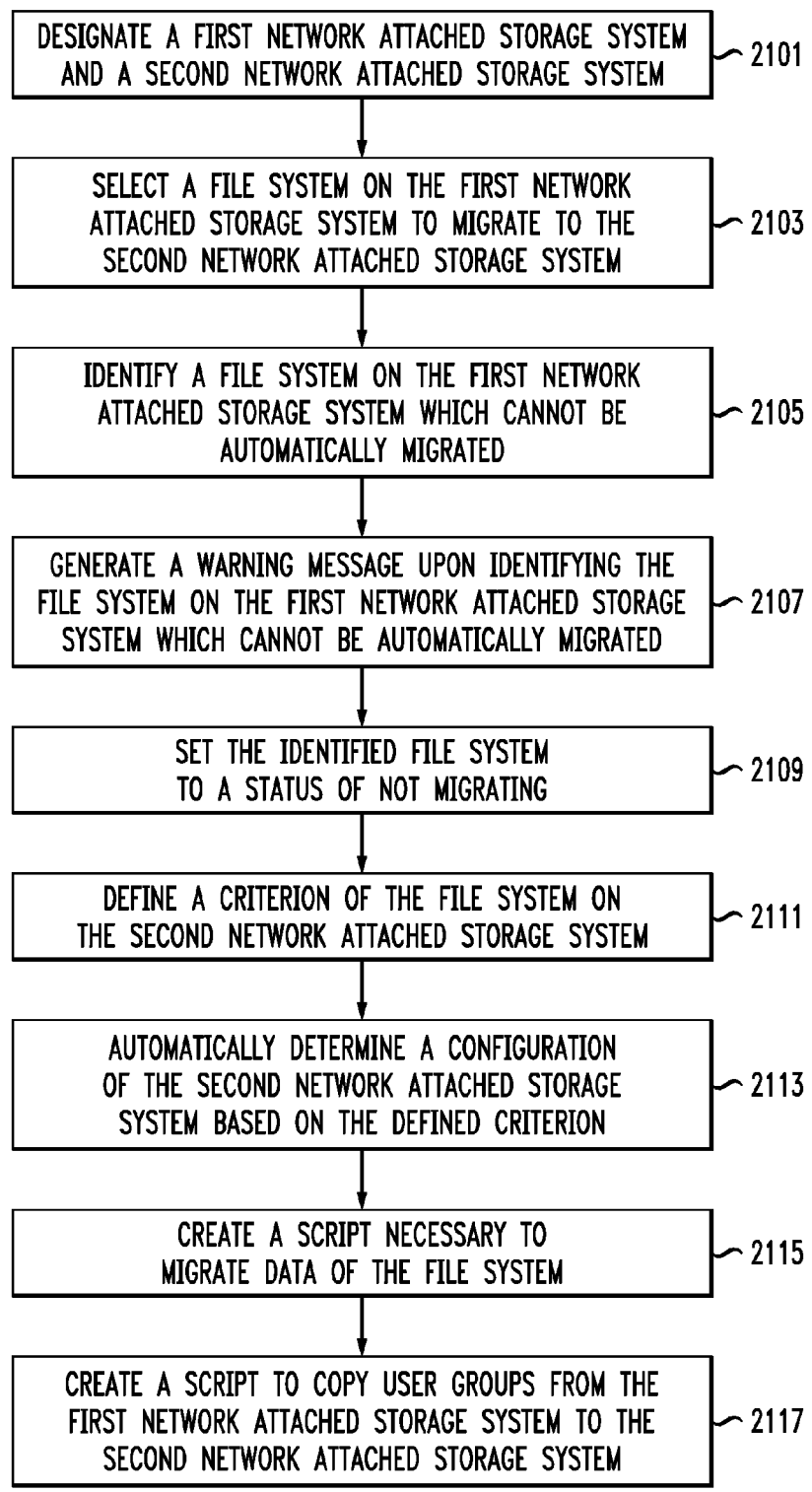
FIG. 21 is a flow chart showing a method for automating configuration and migrating configurations of a file system, in accordance with an embodiment of the present invention.

FIG. 21 is a flow chart showing a method for automating configuration and migrating configurations of a file system, in accordance with an embodiment of the present invention. Unless otherwise stated, the order or number of steps set forth in FIG. 21 is not necessarily limited to what is shown, and may be subject to change. It should be understood that the structure of the flow chart set forth in FIG. 21 be viewed as exemplary rather than as a requirement or limitation of the invention.

Referring to FIG. 21, the method 2100 comprises, at block 2101, designating a first network attached storage system (e.g., source NAS) and a second network attached storage system (e.g., target NAS). The method further comprises, at block 2103, selecting a file system on the first network attached storage system to migrate to the second network attached storage system.

The method may further comprise at block 2105, identifying a file system on the first network attached storage system which cannot be automatically migrated, generating a warning message upon identifying the file system on the first network attached storage system which cannot be automatically migrated at block 2107, and, at block 2109, setting the identified file system to a status of not migrating.

At block 2111, the method further comprises defining a criterion of the file system on the second network attached storage system. Defining the criterion/criteria may comprise defining a capacity of the file system on the second network attached storage system, selecting a security option for security treatment of mixed-protocol access, determining whether to preserve a structure or a security of the file system on the second network attached storage system, and/or determining a number of users having access to the file system on the second network attached storage system. Defining the criteria may also comprise overriding settings of the file system on the first network attached storage system to modify a configuration of the file system on the second network attached storage system. A configuration of the second network attached storage system is automatically determined based on the defined criterion/criteria (block 2113).

The method may also include creating a script necessary to migrate data of the file system (block 2115), and creating a script to copy user groups from the first network attached storage system to the second network attached storage system (block 2117).

Figure 22:
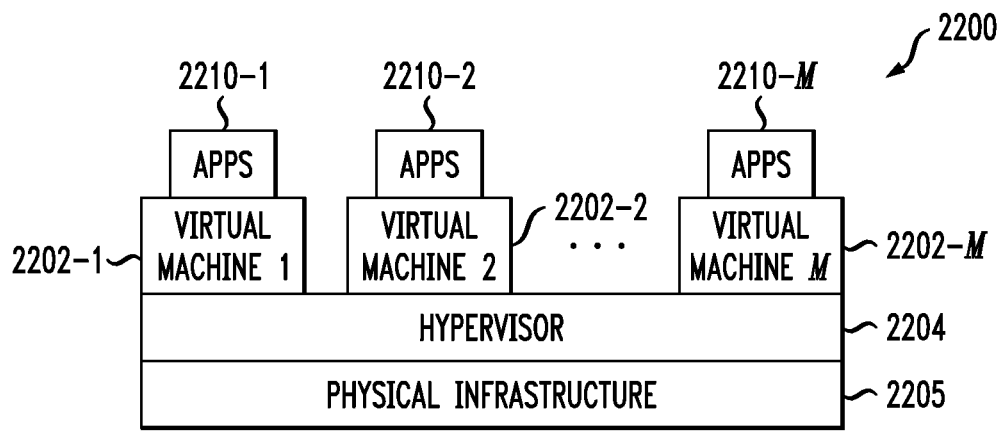
FIGS. 22 and 23 show examples of processing platforms that may be utilized to implement at least a portion of the systems of FIGS. 1 and 2.

As shown in FIG. 22, the cloud infrastructure 2200 comprises virtual machines (VMs) 2202-1, 2202-2, . . . 2202-M implemented using a hypervisor 2204. The hypervisor 2204, as mentioned above, is an example of what is more generally referred to herein as "virtualization infrastructure." The hypervisor 2204 runs on physical infrastructure 2205 (e.g., such as may include CPUs and/or storage devices). The cloud infrastructure 2200 further comprises sets of applications 2210-1, 2210-2, . . . 2210-M running on respective ones of the virtual machines 2202-1, 2202-2, . . . 2202-M (utilizing associated logical units (LUNs)) under the control of the hypervisor 2204.

Although only a single hypervisor 2204 is shown in the example of FIG. 22, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 2204 which, as shown in FIG. 22, is directly inserted on top of the computer hardware in order to allocate hardware resources of the physical computer (physical infrastructure 2205) dynamically and transparently. The hypervisor 2204 affords the ability for multiple operating systems to run concurrently on a single physical computer and share hardware resources with each other. The hypervisor 2204 thus also manages disk I/O scheduling associated with the workloads performed by each virtual machine.

An example of a commercially available hypervisor platform that may be used to implement portions of the cloud infrastructure 2200 in one or more embodiments of the invention is the VMware® vSphere® which may have an associated virtual infrastructure management system such as the VMware® vCenter™. The underlying physical infrastructure 2205 may comprise one or more distributed processing platforms that include storage products such as VNX and Symmetrix® VMAX, both commercially available from EMC Corporation of Hopkinton, Mass. A variety of other storage products may be utilized to implement at least a portion of the cloud infrastructure 2200.

Figure 23:
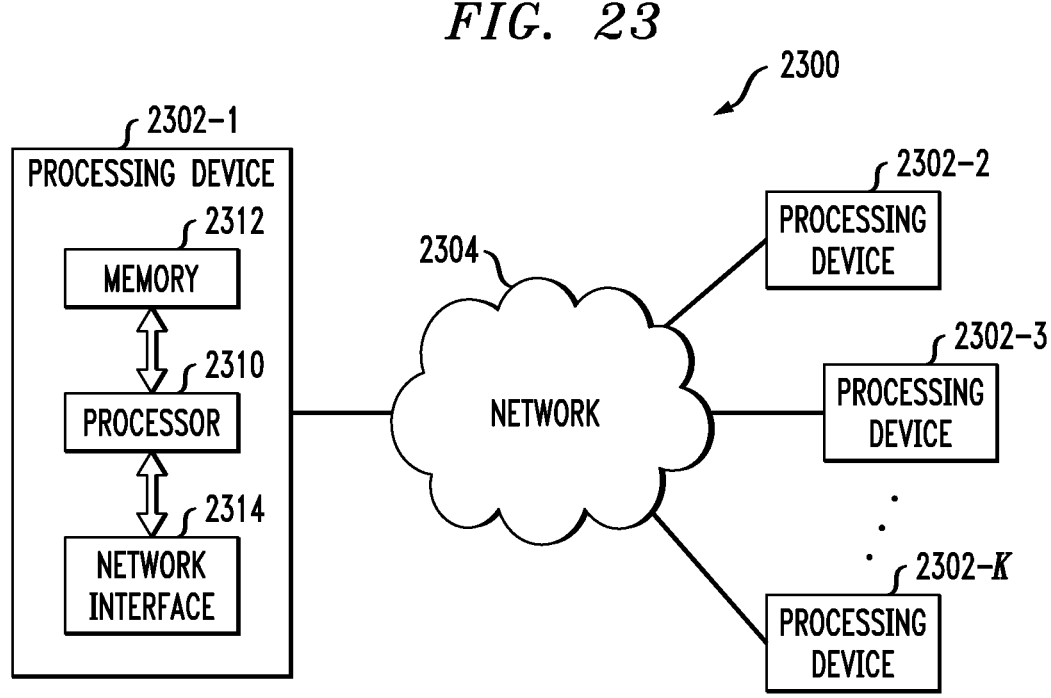

An example of a processing platform on which the cloud infrastructure 2200 and/or the file system configuration and migration management system 140 and configuration and migration engine 142 of FIG. 1 may be implemented is processing platform 2300 shown in FIG. 23. The processing platform 2300 in this embodiment comprises at least a portion of the system 100 and includes a plurality of processing devices denoted 2302-1, 2302-2, 2302-3, . . . 2302-K, which communicate with one another over a network 2304. One or more of the elements of system 100 may therefore each run on one or more computers or other processing platform elements, each of which may be viewed as an example of what is more generally referred to herein as a "processing device." As illustrated in FIG. 23, such a device generally comprises at least one processor 2310 and an associated memory 2312, and implements one or more functional modules for controlling certain features of system 100. Again, multiple elements or modules may be implemented by a single processing device in a given embodiment.

The processing device 2302-1 in the processing platform 2300 comprises a processor 2310 coupled to a memory 2312. The processor 2310 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 2310. Memory 2312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 2312 may comprise electronic memory such as random access memory (RAM), read-only memory (ROM) or other types of memory, in any combination. The one or more software programs when executed by a processing device such as the processing device 2302-1 causes the device to perform functions associated with one or more of the elements of system 100. One skilled in the art would be readily able to implement such software given the teachings provided herein. Other examples of processor-readable storage media embodying embodiments of the invention may include, for example, optical or magnetic disks.

Processing device 2302-1 also includes network interface circuitry 2314, which is used to interface the server with the network 2304 and other system components. Such circuitry may comprise conventional transceivers of a type well known in the art.

The other processing devices 2302 of the processing platform 2300 are assumed to be configured in a manner similar to that shown for processing device 2302-1 in the figure.

The processing platform 2300 shown in FIG. 23 may comprise additional known components such as batch processing systems, parallel processing systems, physical machines, virtual machines, virtual switches, storage volumes, logical units, etc. Again, the particular processing platform shown in FIG. 23 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, the embodiments of the present invention provide techniques for automatic file system migration to a network attached storage (NAS) device. In accordance with embodiments of the present invention, a user is able to specify source file systems and certain target criteria and a processor(s) model and/or script a target NAS configuration, and generate scripts for migration of data, users and/or shares. Embodiments of the invention can also identify file systems which cannot be automatically migrated, and set the identified file systems to a status of not migrating. In this case, a user can choose to either manually migrate those file systems, or override the status of not migrating and automatically detect a target file system. Rules are used to automatically identify information, warning and error conditions so they can be handled appropriately.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
designating a first network attached storage system and a second network attached storage system, wherein the first and second network attached storage systems are operatively coupled to each other via at least one network;
selecting at least one file system on the first network attached storage system to migrate to the second network attached storage system;
defining at least one criterion of the at least one file system on the second network attached storage system;
automatically determining a configuration of the second network attached storage system based on the defined criterion;
identifying at least one other file system on the first network attached storage system as not being automatically migrated, and setting the identified file system to a status of not migrating, wherein the identifying is based on one or more inconsistencies between the first network attached storage system and the second network attached storage system;
providing for selection of one of manually migrating the identified file system, overriding the status of not migrating, and not migrating the identified file system; and
migrating the at least one file system from the first network attached storage system to the second network attached storage system over the at least one network, and, depending on the selection, migrating the at least one other file system from the first network attached storage system to the second network attached storage system over the at least one network;
wherein defining the criterion comprises overriding settings of the at least one file system on the first network attached storage system to modify a configuration of the at least one file system on the second network attached storage system; and
wherein the steps of the method are executed via at least one processor coupled to a memory.

2. The method of claim 1, wherein defining the criterion comprises defining a capacity of the at least one file system on the second network attached storage system.

3. The method of claim 1, wherein defining the criterion comprises selecting a security option for security treatment of mixed-protocol access.

4. The method of claim 1, wherein defining the criterion comprises determining whether to preserve a structure or a security of the at least one file system on the second network attached storage system.

5. The method of claim 1, wherein defining the criterion comprises determining a number of users having access to the at least one file system on the second network attached storage system.

6. The method of claim 1, further comprising generating a warning message upon identifying the at least one other file system on the first network attached storage system as not being automatically migrated.

7. The method of claim 1, further comprising creating a script necessary to migrate data of the at least one file system.

8. The method of claim 1, further comprising creating a script to copy user groups from the first network attached storage system to the second network attached storage system.

9. The method of claim 1, further comprising cleaning up the first network attached storage system after migration is complete.

10. The method of claim 1, further comprising determining a volume status of the at least one other file system, wherein whether the identified file system is set to the status of not migrating is based on the determined volume status of the at least one other file system.

11. The method of claim 1, wherein setting the identified file system to a status of not migrating comprises scanning one or more subdirectories in a volume, and marking the one or more subdirectories with logical units for exclusion from migrating.

12. A computer program product comprising a processor-readable storage medium having encoded therein executable code of one or more software programs, wherein the one or more software programs when executed by the processor device implement the steps of:
designating a first network attached storage system and a second network attached storage system, wherein the first and second network attached storage systems are operatively coupled to each other via at least one network;
selecting at least one file system on the first network attached storage system to migrate to the second network attached storage system;
defining at least one criterion of the at least one file system on the second network attached storage system;
automatically determining a configuration of the second network attached storage system based on the defined criterion;
identifying at least one other file system on the first network attached storage system as not being automatically migrated, and setting the identified file system to a status of not migrating, wherein the identifying is based on one or more inconsistencies between the first network attached storage system and the second network attached storage system;
providing for selection of one of manually migrating the identified file system, overriding the status of not migrating, and not migrating the identified file system; and
migrating the at least one file system from the first network attached storage system to the second network attached storage system over the at least one network, and, depending on the selection, migrating the at least one other file system from the first network attached storage system to the second network attached storage system over the at least one network
wherein defining the criterion comprises overriding settings of the at least one file system on the first network attached storage system to modify a configuration of the at least one file system on the second network attached storage system.

13. An apparatus comprising:
a memory; and
a processor operatively coupled to the memory and configured to:
designate a first network attached storage system and a second network attached storage system, wherein the first and second network attached storage systems are operatively coupled to each other via at least one network;

select at least one file system on the first network attached storage system to migrate to the second network attached storage system;

define at least one criterion of the at least one file system on the second network attached storage system;

automatically determine a configuration of the second network attached storage system based on the defined criterion;

identify at least one other file system on the first network attached storage system as not being automatically migrated, and setting the identified file system to a status of not migrating, wherein the identifying is based on one or more inconsistencies between the first network attached storage system and the second network attached storage system;

provide for selection of one of manually migrating the identified file system, overriding the status of not migrating, and not migrating the identified file system; and migrate the at least one file system from the first network attached storage system to the second network attached storage system over the at least one network, and, depending on the selection, migrate the at least one other file system from the first network attached storage system to the second network attached storage system over the at least one network wherein when defining the criterion, the processor is further operative to override settings of the at least one file system on the first network attached storage system to modify a configuration of the at least one file system on the second network attached storage system.

14. The apparatus of claim 13, wherein when defining the criterion, the processor is further operative to define a capacity of the at least one file system on the second network attached storage system.

15. The apparatus of claim 13, wherein when defining the criterion, the processor is further operative to select a security option for security treatment of mixed-protocol access.

16. The apparatus of claim 13, when defining the criterion, the processor is further operative to determine whether to preserve a structure or a security of the at least one file system on the second network attached storage system.

17. The apparatus of claim 13, wherein the processor is further operative to generate a warning message upon identifying the at least one other file system on the first network attached storage system as not being automatically migrated.

18. The apparatus of claim 13, wherein the processor is further operative to create a script necessary to migrate data of the at least one file system.

19. The apparatus of claim 13, wherein the processor is further operative to create a script to copy user groups from the first network attached storage system to the second network attached storage system.

* * * * *